(12) United States Patent
Oates

(10) Patent No.: US 7,177,344 B2
(45) Date of Patent: Feb. 13, 2007

(54) WIRELESS COMMUNICATION SYSTEMS AND METHODS FOR LONG-CODE COMMUNICATIONS FOR REGENERATIVE MULTIPLE USER DETECTION INVOLVING IMPLICIT WAVEFORM SUBTRACTION

(75) Inventor: John H. Oates, Amherst, NH (US)

(73) Assignee: Mercury Computer Systems, Inc., Chelmsford, MA (US)

( * ) Notice: Subject to any disclaimer, the term of this patent is extended or adjusted under 35 U.S.C. 154(b) by 782 days.

(21) Appl. No.: 10/099,906

(22) Filed: Mar. 14, 2002

(65) Prior Publication Data

US 2003/0002569 A1 Jan. 2, 2003

Related U.S. Application Data

(60) Provisional application No. 60/295,060, filed on Jun. 1, 2001, provisional application No. 60/289,600, filed on May 7, 2001, provisional application No. 60/275, 846, filed on Mar. 14, 2001.

(51) Int. Cl.
*H04B 1/69* (2006.01)
(52) U.S. Cl. ............... 375/143; 375/136; 375/148
(58) Field of Classification Search ........... 375/143, 375/136, 144, 148
See application file for complete search history.

(56) References Cited

U.S. PATENT DOCUMENTS

| | | | |
|---|---|---|---|
| 3,996,455 A | 12/1976 | Schaefer et al. | |
| 5,014,235 A | 5/1991 | Morton | |
| 5,530,877 A | 6/1996 | Hanaoka | |
| 5,566,171 A | 10/1996 | Levinson | |
| 5,576,715 A | 11/1996 | Litton et al. | |
| 5,581,632 A | 12/1996 | Koljonen et al. | ........... 382/150 |

(Continued)

FOREIGN PATENT DOCUMENTS

DE 198 41 578 A1 3/2000

(Continued)

OTHER PUBLICATIONS

Microsoft Corporation, Microsoft Computer Dictionary, 2002, Microsoft Press, Fifth Edition, pp. 326 and 419.

(Continued)

*Primary Examiner*—Temesghen Ghebretinsae
*Assistant Examiner*—Juan Alberto Torres
(74) *Attorney, Agent, or Firm*—Nutter McClennen & Fish LLP; David J. Powsner, Esq.

(57) ABSTRACT

The invention provides improved CDMA, WCDMA (UTMS) or other spread spectrum communication systems of the type that processes one or more spread-spectrum waveforms, each representative of a waveform received from a respective user (or other transmitting device). The improvement is characterized by a first logic element that generates a residual composite spread-spectrum waveform as a function of an arithmetic difference between a composite spread-spectrum waveform for all users (or other transmitters) and an estimated spread-spectrum waveform for each user. It is further characterized by one or more second logic elements that generate, for at least a selected user (or other transmitter), a refined spread-spectrum waveform as a function of a sum of the residual composite spread-spectrum waveform and the estimated spreads-spectrum waveform for that user.

26 Claims, 11 Drawing Sheets

U.S. PATENT DOCUMENTS

| | | | |
|---|---|---|---|
| 5,644,592 A | 7/1997 | Divsalar et al. | 375/206 |
| 5,757,791 A | 5/1998 | Kanterakis et al. | |
| 5,790,534 A | 8/1998 | Kokko et al. | 370/335 |
| 5,809,262 A | 9/1998 | Potter | |
| 5,812,843 A | 9/1998 | Yamazaki et al. | |
| 5,831,984 A | 11/1998 | Hottinen | 370/441 |
| 5,864,549 A | 1/1999 | Honkasalo et al. | 370/335 |
| 5,867,478 A | 2/1999 | Baum et al. | 370/203 |
| 5,870,378 A | 2/1999 | Huang et al. | 370/209 |
| 5,872,776 A | 2/1999 | Yang | 370/342 |
| 5,881,056 A | 3/1999 | Huang et al. | 370/335 |
| 5,933,423 A | 8/1999 | Laakso et al. | 370/335 |
| 5,936,950 A | 8/1999 | Hottinen | 370/342 |
| 5,943,330 A | 8/1999 | Hottinen | 370/335 |
| 6,005,852 A | 12/1999 | Kokko et al. | 370/329 |
| 6,011,812 A | 1/2000 | Laakso et al. | 375/208 |
| 6,014,408 A | 1/2000 | Naruse et al. | |
| 6,018,317 A | 1/2000 | Dogan et al. | |
| 6,047,020 A | 4/2000 | Hottinen | 375/207 |
| 6,064,689 A | 5/2000 | Vollmer | 375/149 |
| 6,067,292 A | 5/2000 | Huang et al. | 370/342 |
| 6,091,788 A | 7/2000 | Keskitalo et al. | 375/347 |
| 6,101,176 A | 8/2000 | Honkasalo et al. | 370/335 |
| 6,105,148 A | 8/2000 | Chung et al. | |
| 6,122,309 A | 9/2000 | Bergstrom et al. | |
| 6,127,973 A | 10/2000 | Choi et al. | |
| 6,128,486 A | 10/2000 | Keskitalo et al. | 455/422 |
| 6,154,443 A | 11/2000 | Huang et al. | |
| 6,154,507 A | 11/2000 | Bottomley | 375/340 |
| 6,161,209 A | 12/2000 | Moher | 714/780 |
| 6,188,718 B1 | 2/2001 | Gitlin et al. | 375/148 |
| 6,192,042 B1 | 2/2001 | Seo | 370/342 |
| 6,212,406 B1 | 4/2001 | Keskitalo et al. | 455/562 |
| 6,215,780 B1 | 4/2001 | Peters et al. | 370/342 |
| 6,219,341 B1 | 4/2001 | Varanasi | 370/252 |
| 6,222,833 B1 | 4/2001 | Seo | 370/342 |
| 6,240,099 B1 | 5/2001 | Lim et al. | 370/441 |
| 6,282,233 B1 * | 8/2001 | Yoshida | 375/148 |
| 6,311,296 B1 | 10/2001 | Congdon | |
| 6,370,130 B1 | 4/2002 | Zhou et al. | |
| 6,470,000 B1 | 10/2002 | Burns et al. | |
| 6,518,980 B1 | 2/2003 | DeMotte et al. | |
| 6,546,026 B1 | 4/2003 | Goeddel | |
| 6,570,864 B1 * | 5/2003 | Kim et al. | 370/342 |
| 6,600,729 B1 | 7/2003 | Suzuki | |
| 6,647,059 B1 | 11/2003 | Faruque | |
| 6,697,973 B1 | 2/2004 | Baumeister, IV et al. | |
| 6,754,805 B1 | 6/2004 | Juan | |
| 6,782,036 B1 | 8/2004 | Dowling et al. | |
| 6,801,565 B1 | 10/2004 | Bottomley et al. | |
| 6,816,541 B1 | 11/2004 | Schmidl | |
| 6,842,480 B1 | 1/2005 | Yang et al. | |
| 6,948,100 B1 | 9/2005 | Sekiguchi et al. | |
| 2001/0053177 A1 | 12/2001 | Papasakellariou | |
| 2002/0051433 A1 | 5/2002 | Affes et al. | |
| 2002/0118728 A1 | 8/2002 | Mohsani | |
| 2002/0122392 A1 | 9/2002 | Elezabi | |
| 2003/0058929 A1 | 3/2003 | Cox | |
| 2003/0076875 A1 | 4/2003 | Oates | |
| 2003/0091058 A1 | 5/2003 | Oates | |
| 2003/0091102 A1 | 5/2003 | Oates | |
| 2003/0091106 A1 | 5/2003 | Oates | |
| 2003/0099224 A1 | 5/2003 | Oates | |
| 2003/0099225 A1 | 5/2003 | Oates | |
| 2003/0103558 A1 | 6/2003 | Oates | |
| 2003/0128739 A1 | 7/2003 | Oates | |
| 2003/0191887 A1 | 10/2003 | Oates | |
| 2003/0198197 A1 | 10/2003 | Oates | |
| 2003/0202559 A1 | 10/2003 | Oates | |
| 2003/0202566 A1 | 10/2003 | Oates | |
| 2003/0206577 A1 | 11/2003 | Liberti, Jr. et al. | |
| 2003/0231702 A1 | 12/2003 | Oates | |
| 2004/0213329 A1 | 10/2004 | Takashi et al. | |

FOREIGN PATENT DOCUMENTS

| | | |
|---|---|---|
| EP | 0 772 306 A2 | 5/1997 |
| EP | 0 876 008 A1 | 11/1998 |
| EP | 0 865 172 A3 | 1/1999 |
| EP | 0 926 913 A2 | 6/1999 |
| EP | 0 929 202 A1 | 7/1999 |
| EP | 0 936 749 A1 | 8/1999 |
| EP | 0 954 112 A2 | 11/1999 |
| EP | 0 955 734 A2 | 11/1999 |
| EP | 0 831 669 A3 | 12/1999 |
| EP | 0 971 485 A1 | 1/2000 |
| EP | 0 982875 A2 | 1/2000 |
| EP | 0 978 951 A2 | 2/2000 |
| EP | 0 978 962 A1 | 2/2000 |
| EP | 0 993 127 A1 | 4/2000 |
| EP | 0 839 412 B1 | 8/2000 |
| EP | 1 035 681 A2 | 9/2000 |
| EP | 1 047 218 A2 | 10/2000 |
| EP | 1 063 780 A2 | 12/2000 |
| EP | 1 065 799 A1 | 1/2001 |
| EP | 1 069 722 A2 | 1/2001 |
| EP | 1 075 158 A2 | 2/2001 |
| EP | 1 077 551 A1 | 2/2001 |
| EP | 1 085 688 A2 | 3/2001 |
| EP | 1 093 235 A2 | 4/2001 |
| EP | 1 091 506 A3 | 5/2001 |
| EP | 1 124 346 A1 | 8/2001 |
| WO | WO 95/12943 | 5/1995 |
| WO | WO 95/14336 | 5/1995 |
| WO | WO 95/28772 | 10/1995 |
| WO | WO 96/01544 | 1/1996 |
| WO | WO 96/11534 | 4/1996 |
| WO | WO 96/37969 | 11/1996 |
| WO | WO 96/37970 | 11/1996 |
| WO | WO 96/37973 | 11/1996 |
| WO | WO 96/37974 | 11/1996 |
| WO | WO 96/37975 | 11/1996 |
| WO | WO 96 37976 | 11/1996 |
| WO | WO 96/38015 | 11/1996 |
| WO | WO 97/02666 | 1/1997 |
| WO | WO 97/15985 | 5/1997 |
| WO | WO 97/21292 | 6/1997 |
| WO | WO 97/35384 | 9/1997 |
| WO | WO 97/36378 | 10/1997 |
| WO | WO 98/10542 | 3/1998 |
| WO | WO 98/17026 | 4/1998 |
| WO | WO 98/18210 | 4/1998 |
| WO | WO 98/24199 | 6/1998 |
| WO | WO 98/38805 | 9/1998 |
| WO | WO 98/45967 | 10/1998 |
| WO | WO 98/47243 | 10/1998 |
| WO | WO 98/51111 | 11/1998 |
| WO | WO 98/59450 | 12/1998 |
| WO | WO 99/01946 | 1/1999 |
| WO | WO 99/33196 | 6/1999 |
| WO | WO 99/35706 | 7/1999 |
| WO | WO 99/41871 | 8/1999 |
| WO | WO 99/59266 | 11/1999 |
| WO | WO 99/66645 | 12/1999 |
| WO | WO 00/04652 | 1/2000 |
| WO | WO 00/18030 | 3/2000 |
| WO | WO 00/49720 | 8/2000 |
| WO | WO 00/51260 | 8/2000 |
| WO | WO 00/54427 | 8/2000 |
| WO | WO 00/52845 | 9/2000 |
| WO | WO 00/54418 | 9/2000 |
| WO | WO 00/72459 A1 | 11/2000 |
| WO | WO 00/72464 A1 | 11/2000 |
| WO | WO 00/72465 A1 | 11/2000 |

| | | |
|---|---|---|
| WO | WO 00/72496 A1 | 11/2000 |
| WO | WO 00/79701 A1 | 12/2000 |
| WO | WO 01/01605 A1 | 1/2001 |
| WO | WO 01/03330 A1 | 1/2001 |
| WO | WO 01/13530 A1 | 2/2001 |
| WO | WO 01/22610 A1 | 3/2001 |
| WO | WO 01/22617 A2 | 3/2001 |
| WO | WO 01/28150 A2 | 4/2001 |
| WO | WO 01/29983 A1 | 4/2001 |
| WO | WO 01/29990 A1 | 4/2001 |
| WO | WO 01/41387 A1 | 6/2001 |
| WO | WO 01/43302 A1 | 6/2001 |
| WO | WO 01/45287 A1 | 6/2001 |
| WO | WO 01/46711 A1 | 6/2001 |
| WO | WO 01/53999 A2 | 7/2001 |
| WO | WO 01/54300 A2 | 7/2001 |
| WO | WO 01/59258 A1 | 8/2001 |
| WO | WO 01/59962 A1 | 8/2001 |

OTHER PUBLICATIONS

S.L. Miller and A. N. Barbosa, "A Modified MMSE Receiver for Detection of DS-CDMA Signals in Fading Channels", 1996, IEEE, Proc. MILCOM '96, pp. 898-902.

Verdu, "Multiuser Detection", 1998, Cambridge, pp. 19-47, 50-67, 237, 235, 288, 289, 344, 345.

* cited by examiner

Figure 12

WIRELESS COMMUNICATION SYSTEMS AND METHODS FOR LONG-CODE COMMUNICATIONS FOR REGENERATIVE MULTIPLE USER DETECTION INVOLVING IMPLICIT WAVEFORM SUBTRACTION

BACKGROUND OF THE INVENTION

This application claims the benefit of priority of (i) U.S. Provisional application Ser. No. 60/275,846 filed Mar. 14, 2001, entitled "Improved Wireless Communications Systems and Methods"; (ii) U.S. Provisional application Ser. No. 60/289,600 filed May 7, 2001, entitled "Improved Wireless Communications Systems and Methods Using Long-Code Multi-User Detection" and (iii) U.S. Provisional application Ser. No. 60/295,060 filed Jun. 1, 2001 entitled "Improved Wireless Communications Systems and Methods for a Communications Computer," the teachings all of which are herein by reference.

The invention pertains to wireless communications and, more particularly, by way of example, to methods and apparatus providing multiple user detection for use in code division multiple access (CDMA) communications. The invention has application, by way of non-limiting example, in improving the capacity of cellular phone base stations.

Code-division multiple access (CDMA) is used increasingly in wireless communications. It is a form of multiplexing communications, e.g., between cellular phones and base stations, based on distinct digital codes in the communication signals. This can be contrasted with other wireless protocols, such as frequency-division multiple access and time-division multiple access, in which multiplexing is based on the user of orthogonal frequency bands and orthogonal time-slots, respectively.

A limiting factor in CDMA communication and, in particular, in so-called direct sequence CDMA (CS-CDMA) communication, is the interference between multiple cellular phone users in the same geographic area using their phones at the same time, which is referred to as multiple access interference (MAI). Multiple access interference has an effect of limiting the capacity of cellular phone base stations, driving service quality below acceptable levels when there are too many users.

A technique known as multi-user detection (MUD) is intended to reduce multiple access interference and, as a consequence, increases base station capacity. It can reduce interference not only between multiple transmissions of like strength, but also that caused by users so close to the base station as to otherwise overpower signals from other users (the so-called near/far problem). MUD generally functions on the principle that signals from multiple simultaneous users can be jointly used to improve detection of the signal from any single user. Many forms of MUD are discussed in the literature; surveys are provided in Moshavi, "Multi-User Detection for DS-CDMA Systems," IEEE Communications Magazine (October, 1996) and Duel-Hallen et al., "Multiuser Detection for CDMA Systems," IEEE Personal Communications (April 1995). Though a promising solution to increasing the capacity of cellular phase base stations, MUD techniques are typically so computationally intensive as to limit practical application.

An object of this invention is to provide improved methods and apparatus for wireless communications. A related object is to provide such methods and apparatus for multi-user detection or interference cancellation in code-division multiple access communications.

A further related object is to provide such methods and apparatus as provide improved short-code and/or long-code CDMA communications.

A further object of the invention is to provide such methods and apparatus as can be cost-effectively implemented and as required minimal changes in existing wireless communications infrastructure.

A still further object of the invention is to provide methods and apparatus for executing multi-user detection and related algorithms in real-time.

A still further object of the invention is to provide such methods and apparatus as manage faults for high-availability.

SUMMARY OF THE INVENTION

Wireless Communication Systems And Methods For Long-code Communications For Regenerative Multiple User Detection Involving Implicit Waveform Subtraction The foregoing and other objects are among those attained by the invention which provides, in one aspect, an improved spread-spectrum communication system of the type that processes one or more spread-spectrum waveforms, e.g., a CDMA transmissions, each representative of a waveform received from, or otherwise associated with, a respective user (or other transmitting device). the improvement is characterized by a first logic element, e.g., operating in conjunction with a wireless base station receiver and/or modem, that generates a residual composite spread-spectrum waveform as a function of a composite spread-spectrum waveform and an estimated composite spread-spectrum waveform. It is further characterized by one or more second logic elements that generate, for at least a selected user (or other transmitter), a refined matched-filter detection statistic as a function of the residual composite spread-spectrum waveform generated by the first logic element and a characteristic of an estimate of the selected user's spread-spectrum waveform.

Related aspects of the invention as described above provide a system as described above in which the first logic element comprises arithmetic logic that generates the composite spread-spectrum waveform based on a relation $$r_{rex}^{(n)}[t] \equiv r[t] - \hat{r}^{(n)}[t]$$

wherein $r_{res}^{(n)}[t]$ is the residual composite spread-spectrum waveform, r[t] represents the composite spread-spectrum waveform, $\hat{r}^{(n)}[t]$ represents the estimated composite spread-spectrum waveform, t is a sample time period, and n is an iteration count, The estimated composite spread-spectrum waveform, according to further related aspects, can be pulse-shaped and based on estimated complex amplitudes, estimated symbols, and codes encoded within the user waveforms.

Still further aspects of the invention provide improved spread-spectrum communication systems as described above in which the one or more second logic elements comprise rake logic and summation logic, which generate the refined matched-filter detection statistic for at least the selected user based on a relation $$y_k^{n+1}[m] = A_k^{(n)^2} \cdot \hat{b}_k^{(n)}[m] + y_{res,k}^{(n)}[m]$$

wherein $A_k^{(n)^2}$ represents an amplitude statistic, $\hat{b}_k^{(n)}[m]$ represents a soft symbol estimate for the $k^{th}$ user for the $m^{th}$ symbol period, $y_{rex,k}^{(n)}[m]$ represents a residual matched-filter detection statistic for the $k^{th}$ user, and n is an iteration count.

Further related aspects of the invention provide improved systems as described above wherein the refined matched-filter detection statistics for each user is iteratively generated. Related aspects of the invention provide such systems in which the user spread-spectrum waveform for at least a selected user is generated by a receiver that operates on long-code CDMA signals.

Further aspects of the invention provide a spread spectrum communication system, e.g., of the type described above, having a first logic element which generates an estimated composite spread-spectrum waveform as a function of estimated user complex channel amplitudes, time lags, and user codes. A second logic element generates a residual composite spread-spectrum waveform a function of a composite user spread-spectrum waveform and the estimated composite spread-spectrum waveform. One or more third logic elements generate a refined matched-filter detection statistic for at least a selected user as a function of the residual composite spread-spectrum waveform and a characteristic of an estimate of the selected user's spread-spectrum waveform.

A related aspects of the invention provides such systems in which the first logic element generates the estimated re-spread waveform based on a relation $$\rho^{(n)}[t] = \sum_{k=1}^{K_v} \sum_{p=1}^{L} \sum_r \delta[t - \hat{\tau}_{kp}^{(n)} - rN_c] \cdot \hat{a}_{kp}^{(n)} \cdot c_k[r] \cdot \hat{b}_k^{(n)}[\lfloor r/N_k \rfloor]$$

wherein $K_v$ is a number of simultaneous dedicated physical channels for all users, $\delta[t]$ is a discrete-time delta function, $\hat{a}_{kp}^{(n)}$ is an estimated complex channel amplitude for the $p^{th}$ multipath component for the $k^{th}$ user, $c_k[r]$ represents a user code comprising at least a scrambling code, an orthogenal variable spreading factor code, and a j factor associated with even numbered dedicated physical channels.

$\hat{b}_k^{(n)}[m]$ represents a soft symbol estimate for the $k^{th}$ user for the $m^{th}$ symbol period, $\hat{\tau}_{kp}^{(n)}$ is an estimated time lag for the $p^{th}$ multipath component for the $k^{th}$ user, $N_k$ is a spreading factor for the $k^{th}$ user, t is a sample time index, L is a number of multi-path components, $N_c$ is a number of samples per chip, and n is an iteration count.

Related aspects of the invention provide systems as described above wherein the first logic element comprises arithmetic logic that generates the estimated composite spread-spectrum waveform based on the relation $$\hat{r}^{(n)}[t] = \sum_r g[r]\rho^{(n)}[t-r],$$

wherein $\hat{r}^{(n)}[t]$ represents the estimated composite spread-spectrum waveform, g[t] represents a raised-cosine pulse shape.

Related aspects of the invention provide such systems that comprise a CDMA base station, e.g., of the type for use in relaying voice and data traffic from cellular phone and/or modem users. Still further aspects of the invention provide improved spread spectrum communication systems as described above in which the user waveforms are encoded using long-code CDMA protocols.

Still other aspects of the invention provide methods multiple user detection in a spread-spectrum communication system paralleling the operations described above.

Wireless Communication Systems And Methods For Long-code Communications For Regenerative Multiple User Detection Involving Matched-filter Outputs Further aspects of the invention provide an improved spread spectrum communication system, e.g., of the type described above, having first logic element operating in conjunction with a wireless base station receiver and/or modem, that generates an estimated composite spread-spectrum waveform as a function of user waveform characteristics, e.g., estimated complex amplitudes, time lags, symbols and code. The invention is further characterized by one or more second logic elements that generate for at least a selected user a refined matched-filter detection statistic as a function of a difference between a first matched-filter detection statistic for that user and an estimated matched-filter detection statistic—the latter of which is a function of the estimated composite spread-spectrum waveform generated by the first logic element.

Related aspects of the invention as described above provide for improved wireless communications wherein each of the second logic elements generate the refined matched-filter detection statistic for the selected user as a function of a difference between (i) a sum of the first matched-filter detection statistic for that user and a characteristic of an estimate of that user's spread-spectrum waveform, and (ii) the estimated matched-filter detection statistic for that user based on the estimated composite spread-spectrum waveform.

Further related aspects of the invention provide systems as described above in which the second logic elements comprise rake logic and summation logic which generates refined matched-filter detection statistics for at least a selected user in accord with the relation $$y_k^{(n+1)}[m] = a_k^{(n)^1} \cdot \hat{b}_k^{(n)}[m] + y_k^{(n)}[m] - y_{est,k}^n[m]$$

wherein $A_k^{(n)^2}$ represents an amplitude statistic, $\hat{b}_k^{(n)}[m]$ represents a soft symbol estimate for the $k^{th}$ user for the mth symbol period, $y_k^{(n)}[m]$ represents the first matched-filter detection statistic, $y_{est,k}^{(n)}[m]$ represents the estimated matched-filter detection statistic, and n is an iteration count.

Other related aspects of the invention include generating the refined matched-filter detection statistic for the selected user and iteratively refining that detection statistic zero or more times.

Related aspects of the invention as described above provide for improved wireless communications methods wherein an estimated composite spread-spectrum waveform is based on the relation $$y_{est,k}^{(n)}[m] \equiv \text{Re}\left\{\sum_{p=1}^{L} \hat{a}_{kp}^{(n)H} \cdot \frac{1}{2N_p} \sum_{r=0}^{N_k-1} \hat{r}^{(n)}[rN_c + \hat{\tau}_{kp}^{(n)} + mT_k] \cdot c_{km}^{*}[r]\right\},$$

wherein

L is a number of multi-path components, $\hat{a}_{kp}^{(n)}$ is an estimated complex channel amplitude for the $p^{th}$ multipath component for the $k^{th}$ user, $N_k$ is a spreading factor for the $k^{th}$ user, $\hat{r}^{(n)}[t]$ represents the estimated composite spread-spectrum waveform, $N_c$ is a number of samples per chip, $\hat{\tau}_{kp}^{(n)}$ is an estimated time lag for the $p^{th}$ multipath component for the $k^{th}$ user, m is a symbol period, $T_k$ is a data bit duration, n is an iteration count, and $c_{km}[r]$ represents a user code comprising at least a scrambling code, an orthogonal variable spreading factor code, and a j factor associated with even numbered dedicated physical channels.

Wireless Communication Systems And Methods For Long-code Communications For Regenerative Multiple User Detection Involving Premaximal Combination Matched Filter Outputs Still further aspects of the invention provide improved-spread spectrum communication systems, e.g., of the type described above, having one or more first logic elements, e.g., operating in conjunction with a wireless base station receiver and/or modem, that generate a first complex channel amplitude estimate corresponding to at least a selected user and a selected finger of a rake receiver that receives the selected user waveforms. One or more second logic elements generate an estimated composite spread-spectrum waveform that is a function of one or more complex channel amplitudes, estimated delay lags, estimated symbols, and/or codes of the one or more user spread-spectrum waveforms. One or more third logic elements generate a second pre-combination matched-filter detection statistic for at least a selected user and for at least a selected finger as a function of a first pre-combination matched-filter detection statistic for that user and a pre-combination estimated matched-filter detection statistic for that user.

Related aspects of the invention provide system as described above in which one or more fourth logic elements generate a second complex channel amplitude estimate corresponding to at least a selected user and at least selected finger.

Still further aspects of the invention provide systems as described above in which the third logic elements generate the second pre-combination matched-filter detection statistic for at least the selected user and at least the selected finger as a function of a difference between (i) the sum of the first pre-combination matched-filter detection statistic for that user and that finger and a characteristic of an estimate of the selected user's spread-spectrum waveform and (ii) the pre-combination estimated matched-filter detection statistic for that user and that finger.

Related aspects of the invention as described above provide for the first logic elements generating a complex channel amplitude estimated corresponding to at least a selected user and at least a selected finger of a rake receiver that receives the selected user waveforms based on a relation $$\hat{a}_{kp}^{(n)} \equiv \sum_{s} w[s] \cdot \frac{1}{N_p} \sum_{m=0}^{N_p-1} y_{kp}^{(n)}[m + Ms] \cdot \hat{b}_{k}^{(n)}[m + Ms]$$

wherein $\hat{a}_{kp}^{(n)}$ is a complex channel amplitude estimate corresponding to the $p^{th}$ finger of the $k^{th}$ user, w[s] is a filter, $N_p$ is a number of symbols, $y_{kp}^{(n)}[m]$ is a first pre-combination matched-filter detection statistic corresponding to the $p^{th}$ finger of the $k^{th}$ user for the $m^{th}$ symbol period, M is a number of symbols per slot, $\hat{b}_{k}^{(n)}[m]$ represents a soft symbol estimate for the $k^{th}$ user for the $m^{th}$ symbol period, m is a number symbol period index, s is a slot index, and n is an iteration count.

Further related aspects of the invention as described above provide for one or more second logic elements, each coupled with a first logic element and using the complex channel amplitudes generated therefrom to generate an estimated composite re-spread waveform based on the relation $$\rho^{(n)}[t] = \sum_{k=1}^{K_v} \sum_{p=1}^{L} \sum_{r} \delta[t - \hat{\tau}_{kp}^{(n)} - rN_c] \cdot \hat{a}_{kp}^{(n)} \cdot c_k[r] \cdot \hat{b}_{k}^{(n)}[\lfloor r/N_k \rfloor],$$

wherein $K_v$ is a number of simultaneous dedicated physical channels for all users, $\delta[t]$ is a discrete-time delta function, $\hat{a}_{kp}^{(n)}$ is an estimated complex channel amplitude for the $p^{th}$ multipath component for the $k^{th}$ user, $c_k[r]$ represents a user code comprising at least a scrambling code, an orthogonal variable spreading factor code, and a j factor associated with even numbered dedicated physical channels, $\hat{b}_{k}^{(n)}[m]$ represents a soft symbol estimate for the $k^{th}$ user for the $m^{th}$ symbol period, $\hat{\tau}_{kp}^{(n)}$ is an estimated time lag for the $p^{th}$ multipath component for the $k^{th}$ user, $N_k$ is a spreading factor for the $k^{th}$ user, t is a sample time index, L is a number of multi-path components, $N_c$ is a number of samples per chip, and n is an iteration count.

Further related aspects of the invention provide systems as described above in which the second logic element comprises arithmetic logic that generates the estimated composite spread-spectrum waveform based on a relation $$\hat{r}^{(n)}[t] = \sum_r g[r]\rho^{(n)}[t-r]$$

wherein $\hat{r}^{(n)}[t]$ represents the estimated composite spread-spectrum waveform, g[t] represents a pulse shape.

Still further related aspects of the invention provide systems as described above in which the third logic elements comprise arithmetic logic that generates the second pre-combination matched-filter detection statistic based on the relation $$y_{kp}^{(n+1)}[m] = \hat{a}_{kp}^{(n)} \cdot \hat{b}_k^{(n)}[m] + y_{kp}^{(n)}[m] - y_{est.kp}^{(n)}[m]$$

wherein $y_{kp}^{(n+1)}[m]$ represents the pre-combination matched-filter detection statistic for the $p^{th}$ finger for the $k^{th}$ user for the $m^{th}$ symbol period, $\hat{a}_{kp}^{(n)}$ is the complex channel amplitude for the $p^{th}$ finger for the $k^{th}$ user.

$\hat{b}_k^{(n)}[m]$ represents a soft symbol estimate for the $k^{th}$ user for the $m^{th}$ symbol period, $y_{kp}^{(n)}[m]$ represents the first pre-combination matched-filter detection statistic for the $p^{th}$ finger for the $k^{th}$ user for the $m^{th}$ symbol period, $y_{est.kp}^{(n)}[m]$ represents the pre-combination estimated matched-filter detection statistic for the $p^{th}$ finger for the $k^{th}$ user for the $m^{th}$ symbol period, and n is an iteration count.

Still further aspects of the invention provide methods of operating multiuser detector logic, wireless base stations and/or other wireless receiving devices or systems operating in the manner of the apparatus above. Further aspects of the invention provide such systems in which the first and second logic elements are implemented on any of processors, field programmable gate arrays, array processors and co-processors, or any combination thereof. Other aspects of the invention provide for interatively refining the pre-combination matched-filter detection statistics zero or more time.

Other aspects of the invention provide methods for an improved spread-spectrum communication system as the type described above.

BRIEF DESCRIPTION OF THE ILLUSTRATED EMBODIMENT

A more complete understanding of the invention may be attained by reference to the drawings, in which:

FIG. 12 illustrates skewing of multiple user waveforms.

DETAILED DESCRIPTION OF THE ILLUSTRATED EMBODIMENT

Figure 1:
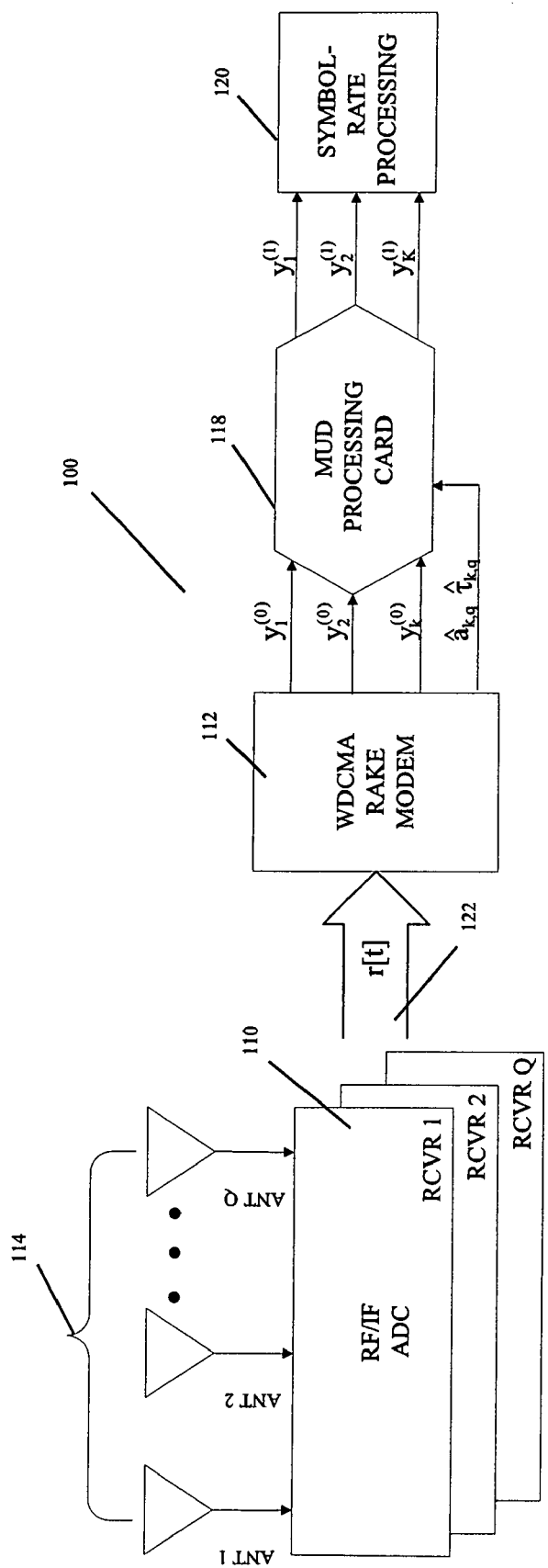
FIG. 1 is a block diagram of components of a wireless base-station utilizing a multi-user detection apparatus according to the invention.
Figure 2:
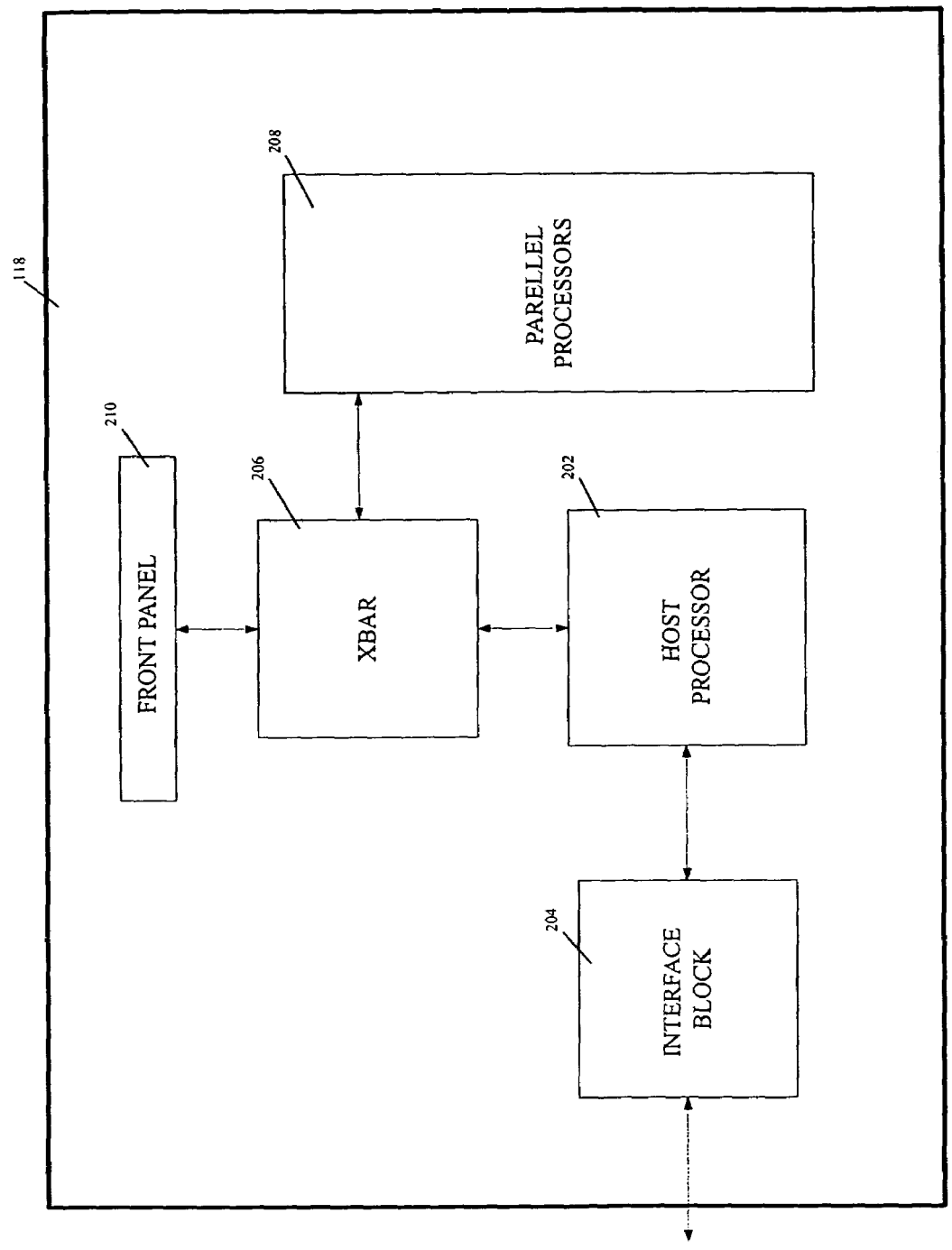
FIG. 2 is a detailed diagram of a modem of the type that receives spread-spectrum waveforms and generates a baseband spectrum waveform together with amplitude and time lag estimates as used by the invention.

Code-division multiple access (CDMA) waveforms or signals transmitted, e.g., from a user cellular phase, modem or other CDMA signal source, can become distorted by, and undergo amplitude fades and phase shifts due to phenomena such as scattering, diffraction and/or reflection off buildings and other natural and man-made structures. This includes CDMA, DS/CDMA, IS-95 CDMA, CDMAOne, CDMA2000 1X, CDMA2000 1xEV-DO, WCDMA (or UTMS), and other forms of CDMA, which are collectively referred to hereinafter as CDMA or WCDMA. Often the user or other source (collectively, "user") is also moving, e.g., in a case or train, adding to the resulting signal distortion by alternately increasing and decreasing the distances to and numbers of building, structures and other distorting factors between the user and the base station.

In general, because each user signal can be distorted several different ways en route to the base station or other receiver (hereinafter, collectively, "base station"), the signal may be received in several components, each with a different time lag or phase shift. To maximize detection of a given user signal across multiple tag lags, a rake receiver is utilized. Such a receiver is coupled to one or more RF antennas (which serve as a collection point(s) for the time-lagged components) and includes multiple fingers, each designed to detect a different multipath component of the user signal. By combining the components, e.g., in power or amplitude, the receiver permits the original waveform to be discerned more readily, e.g., by downstream elements in the base station and/or communications path.

A base station must typically handle multiple user signals, and detect and differentiate among signals received from multiple simultaneous users, e.g., multiple cell phone users in the vicinity of the base station. Detection is typically accomplished through use of a multiple rake receivers, one dedicated to each user. This strategy is referred to as single user detection (SUD). Alternately, one larger receiver can be assigned to demodulate the totality of users jointly. This strategy is referred to as multiple user detection (MUD). Multiple user detection can be accomplished through various techniques which aim to discern the individual user signals and to reduce signal outage probability or bit-error rates (BER) to acceptable levels.

However, the process has heretofore been limited due to computational complexities which can increase exponentially with respect to the number of simultaneous users. Described below are embodiments that overcome this, providing, for example, methods for multiple user detection wherein the computational complexity is linear with respect to the number of users and providing, by way of further example, apparatus for implementing those and other methods that improve the throughput of CDMA and other spread-spectrum receivers. The illustrated embodiments are implemented in connection with long-code CDMA transmitting and receiver apparatus; however those skilled in the art will appreciate that the methods and apparatus therein may be used in connection with short-code and other CDMA signalling protocols and receiving apparatus, as well as with other spread spectrum signalling protocols and receiving apparatus. In these regards and as used herein, the terms long-code and short-code are used in their conventional sense: the former referring to codes that exceed one symbol period; the latter, to codes that are a single symbol period or less.

Five embodiments of long-code regeneration and waveform refinement are presented herein. The first two may be referred to as a base-line embodiment and a residual signal embodiment. The remaining three embodiments use implicit waveform subtraction, matched-filter outputs rather than antenna streams and pre-maximum ratio combination of matched-filter outputs. It will be appreciated by those skilled in the art, that other modifications to these techniques can be implemented that produce the like results based on modifications of the methods described herein.

FIG. 1 depicts components of a wireless base station 100 of the type in which the invention is practiced. The base station 100 includes an antenna array 114, radio frequency/intermediate frequency (RF/IF) analog-to-digital converter (ADC), multi-antenna receivers 110, rake modems 112, MUD processing logic 118 and symbol rate processing logic 120, coupled as shown.

Antenna array 114 and receivers 110 are conventional such devices of the type used in wireless base stations to receive wideband CDMA (hereinafter "WCDMA") transmissions from multiple simultaneous users (here, identified by numbers 1 through K). Each RF/IF receiver (e.g., 110) is coupled to antenna or antennas 114 in the conventional manner known in the art, with one RF/IF receiver 110 allocated for each antenna 114. Moreover, the antennas are arranged per convention to receive components of the respective user waveforms along different lagged signal paths discussed above. Though only three antennas 114 and three receivers 110 are shown, the methods and systems taught herein may be used with any number of such devices, regardless of whether configured as a base station, a mobile unit or otherwise. Moreover, as noted above, they may be applied in processing other CDMA and wireless communications signals.

Each RF/IF receiver 110 routes digital data to each modem 112. Because there are multiple antennas, here, Q of them, there are typically Q separate channel signals communicated to each modem card 112.

Generally, each user generating a WCDMA signal (or other subject wireless communication signal) received and processed by the base station is assigned a unique long-code code sequence for purpose of differentiating between the multiple user waveforms received at the basestation, and each user is assigned a unique rake modem 112 for purpose of demodulating the user's received signal. Each modem 112 may be independent, or may share resources from a pool. The rake modems 112 process the received signal components along fingers, with each receiver discerning the signals associated with that receiver's respective user codes. The received signal components are denoted here as $r_{kq}[t]$ denoted the channel signal (or waveform) from the $k^{th}$ user from the $q^{th}$ antenna, or $r_k[t]$ denoted all channel signals (or waveforms) originating from the $k^{th}$ user, in which case $r_k[t]$ is understood to be a column vector with one element for each of the Q antennas. The modems 112 process the received signals $r_k[t]$ to generate detection statistics $y_k^{(0)}[m]$ for the $k^{th}$ user for the mth symbol period. To this end, the modems 112 can, for example, combine the components $r_{kq}[t]$ by power, amplitude or otherwise, in the conventional manner to generate the respective detection statistics $y_k^{(0)}[m]$. In the course of such processing, each modem 112 determines the amplitude (denoted herein as $\alpha$) of and time lag (denoted herein as $\tau$) between the multiple components of the respective user channel. The modems 112 can be constructed and operated in the conventional manner known in the art, optionally, as modified in accord with the teachings of some of the embodiments below.

The modems 112 route their respective user detection statistics $y_k^{(0)}[m]$, as well as the amplitudes and time lags, to common user detection (MUD) 118 logic constructed and operated as described in the sections that follow. The MUD logic 118 processes the received signals from each modem 112 to generate a refined output, $y_k^{(1)}[m]$, or more generally, $y_k^{(n)}[m]$, where n is an index reflecting the number of times the detection statistics are iteratively or regeneratively processed by the logic 118. Thus, whereas the detection statistic produced by the modems is denoted as $y_k^{(0)}[m]$ indicating that there has been no refinement, those generated by processing the $y_k^{(0)}[m]$ detection statistics with logic 118 are denoted $y_k^{(1)}[m]$, those generated by processing the $y_k^{(1)}[m]$ detection statistics with logic 118 are denoted $y_k^{(2)}[m]$, and so forth. Further waveforms used and generated by logic 118 are similarly denoted, e.g., $r^{(n)}[t]$.

Though discussed below are embodiments in which the logic 118 is utilized only once, i.e., to generate $y_k^{(1)}[m]$ from $y_k^{(0)}[m]$, other embodiments may employ that logic 118 multiple times to generate still more refined detection statistics, e.g., for wireless communications applications requiring lower bit error rates (BER). For example, in some implementations, a single logic stage 118 is used for voice applications, whereas two or more logic stages are used for data applications. When multiple stages are employed, each may be carried out using the same hardware device (e.g., processor, co-processor or field programmable gate array) or with a successive series of such devices.

The refined user detection statistics, e.g., $y_k^{(1)}[m]$ or more generally $y_k^{(n)}[m]$, are communicated by the MUD process 118 to a symbol process 120. This determines the digital information contained within the detection statistics, and processes (or otherwise directs) that information according to the type of user class for which the user belongs, e.g., voice or data user, all in the conventional manner.

Though the discussion herein focuses on use of MUD logic 118 in a wireless base station, those skilled in the art will appreciate that the teachings hereof are equally applicable to MUD detection in any other CDMA signal processing environment such as, by way of non-limiting example, cellular phones and modems. For convenience, such cellular base stations other environments are referred to herein as "base stations".

Referring to FIG. 1, modem 100 receives the channel-signals r[t] 122 from the RF/IC receiver. The signals are first input into a searcher receiver. The searcher receiver analyzes the digital waveform input, and estimates a time offset $\hat{\tau}_{kp}^{(n)}$ for each signal component (e.g., for each finger). As those skilled in the art will appreciate, the "hat" or ˆ symbol denotes estimated values. The time offset for each antenna channel is communicated to a corresponding rake receiver.

The rake receiver receivers receive both the digital signals r[t] from the RF/IF receivers, and the time offsets, $\hat{\tau}_{kp}^{(n)}$. The receivers calculate the pre-combination matched-filter detection statistics, $y_{kp}^{(0)}[m]$, and estimate signal amplitude, $\hat{\alpha}_{kp}^{(n)}$, for each of the signals. The amplitudes are complex in value, and hence include both the magnitude and phase information. The pre-combination matched-filter detection statistics, $y_{kp}^{(0)}[m]$, and the amplitudes $\hat{\alpha}_{kp}^{(n)}$ for each finger receiver, are routed to a maximal ratio combining (MRC) process and combined to form a first approximation of the symbols transmitted by each user, denoted $y_k^{(0)}[m]$. While the MRC process is utilized in the illustrated embodiment, other methods for combining the multiple signals are known in the art, e.g., optimal combining, equal gain combining and selection combining, among others, and can be used to achieve the same results.

At this point, it can be appreciated by one skilled in the art that each detection statistic, $y_k^{(0)}[m]$, contains not only the signal originating from user k, but also has components (e.g., interference and noise) that have originated in the channel (e.g., the environment in which the signal was propagated and/or in the receiving apparatus itself). Hence, it is further necessary to differentiate each user's signal from all others. This function is provided by the multiple user detection (MUD) card 118.

The methods and apparatus described below provide for processing long-code WCDMA at sample rates and can be introduced into a conventional base station as an enhancement to the matched-filter rake receiver. The algorithms and processes can be implemented in hardware, software, or any combination of the two including firmware, field programmable gate arrays (FPGAs), co-processors, and/or array processors.

The following discussion illustrates the calculations involved in the illustrated multiple user detection process. For the following discussion, and as can be recognized by one skilled in the art, the term physical user refers to an actual user. Each physical user is regarded as a composition of virtual users. The concept of virtual users is used to account for both the dedicated physical data channels (DPDCH) and the dedicated physical control channel (DPCCH). These are 1+$N_{dk}$ virtual users corresponding to the $k^{th}$ physical user, where $N_{dk}$ is the number of DPDCHs for the $k^{th}$ user.

As one with ordinary skill in the art can appreciate, when long-codes are used, the baseband received signals, r[t],, which is a column vector with one element per antenna, can be modeled as:

$$r[t] = \sum_{k=1}^{K_v} \sum_m \check{s}_{km}[t - mT_k]b_k[m] + w[t] \quad (1)$$

where t is the integer time sample index, $K_v$ is the number of virtual users, $T_k = N_k N_c$ is the channel symbol duration, which depends on the user spreading factor, $N_k$ is the spreading factor for the $k^{th}$ virtual user, $N_c$ is the number of samples per chip, w[t] is receiver noise and other-cell interference, $\check{s}_{km}[t]$ is the channel-corrupted signature waveform for the $k^{th}$ virtual user over the $m^{th}$ symbol period, and $b_k[m]$ is the channel symbol for the $k^{th}$ virtual user over the $m^{th}$ symbol period.

Since long-codes extend over many symbol periods, the user signature waveform and hence the channel-corrupted signature waveform vary from symbol period to symbol period. For L multi-path components, the channel-corrupted signature waveform for the $k^{th}$ virtual user is modeled as, $$\check{s}_{km}[t] = \sum_{p=1}^{L} a_{kp} s_{km}[t - \tau_{kp}] \quad (2)$$

where $\alpha_{kp}$ are the complex multi-path amplitudes. The amplitude ratios $\beta_k$ are incorporated into the amplitudes $\alpha_{kp}$. One skilled in the art will see that if k and l are virtual users corresponding to the DPCCH and the DPDCHs of the same physical user, then, aside from scaling by $\beta_k$ and $\beta_l$, the amplitudes $\alpha_{kp}$ and $\alpha_{lp}$ are equal. This is due to the fact that the signal waveforms for both the DPCCH and the DPDCH pass through the same channel.

The waveform $s_{km}[t]$ is referred to as the signature waveform for the $k^{th}$ virtual user over the $m^{th}$ symbol period. This waveform is generated by passing the code sequence $c_{km}[n]$ through a pulse-shaping filter g[t].

$$s_{km}[t] = \sum_{r=0}^{N_k-1} g[t - rN_c]c_{km}[r] \quad (3)$$

where g[t] is the raised-cosine pulse shape. Since g[t] is a raised cosine pulse as opposed to a root-raised-cosine pulse, the received signal r[t] represents the baseband signal after filtering by the matched chip filter. The code sequence $c_{km}[r] \equiv c_k[r+mN_k]$ represents the combined scrambling code, orthogonal variable spreading factor (OVSF) code and j factor associated with even numbered DPDCHs.

The received signal r[t] which has been match-filtered to the chip pulse is next match-filtered by the user long-code sequence filter and combined over multiple fingers. The resulting detection statistic is denoted here as $y_l[m]$, the matched-filter output for the $l^{th}$ virtual user over the $m^{th}$ symbol period. The matched-filter output $y_l[m]$ for the $l^{th}$ virtual user can be written.

$$y_l[m] \equiv \text{Re}\left\{ \sum_{q=1}^{L} a_{lq}^H \cdot \frac{1}{2N_t} \sum_{n=0}^{N_t-1} r[nN_c + \hat{\tau}_{lq} + mT_l] \cdot c_{lm}^*[n] \right\} \quad (4)$$

where $\hat{\alpha}_{lq}^H$ is the estimate of $\alpha_{lq}^H$, and $\hat{\tau}_{lq}$ is the estimate of $\tau_{lq}$.

Because of the extreme computational complexity of symbol-rate multiple user detection for long-codes, it is advantageous to resort to regenerative multiple user detection when long-codes are used. Although regenerative multiple user detection operates at the sample rate, for long-codes the overall complexity is lower than with symbol-rate multiple user detection. Symbol-rate multiple user detection requires calculating the correlation matrices every symbol period, which is unnecessary with the signal regeneration methods described herein.

For regenerative multiple user detection, the signal waveforms of interferers are regenerated at the sample rate and effectively subtracted from the received signal. A second pass through the matched filter then yields improved performance. The computational complexity of regenerative multiple user detection is linear with the number of users.

By way of review, the implementation of the regenerative multiple user detection can be implemented sa a baseline implementation. Referring back to the received signal, r[t]:

$$r[t] = \sum_{k=1}^{K_v} \sum_m \sum_{p=1}^{L} a_{kp} s_{km}[t - \tau_{kp} - mT_k] b_k[m] + w[t] = \quad (5)$$

$$\sum_{k=1}^{K_v} r_k[t] + w[t] r_k[t] \equiv \sum_m \sum_{p=1}^{L} a_{kp} s_{km}[t - \tau_{kp} - mT_k] b_k[m]$$

For the baseline implementation, all estimated interference is subtracted yielding a cleaned-up signal $\hat{r}_l^{(n+1)}[t]$ as follows:

$$\hat{r}_l^{(n+1)}[t] = \quad (6)$$

$$r[t] - \sum_{\substack{k=1 \\ k \neq l}}^{K_v} \hat{r}_k^{(n)}[t] \hat{r}_k^{(n)}[t] \equiv \sum_m \sum_{p=1}^{L} \hat{a}_{kp}^{(n)} \cdot s_{km}[t - \hat{\tau}_{kp}^{(n)} - mT_k] \cdot b_k^{(n)}[m]$$

The implementation represented by Equation (6) corresponds to a total subtraction of the estimated interference. One skilled in the art will appreciate that performance can typically be improved if only a fraction of the total estimated interference is subtracted (i.e., partial interference subtraction), this owing to channel and symbol estimation errors. Equation (6) is easily modified so as to incorporate partial interference cancellation by introducing a multiplicative constant of magnitude less than unity to the sum total of the estimated interference. When multiple cancellation stages are used the optimum value of this constant is different for each stage.

Figure 3:
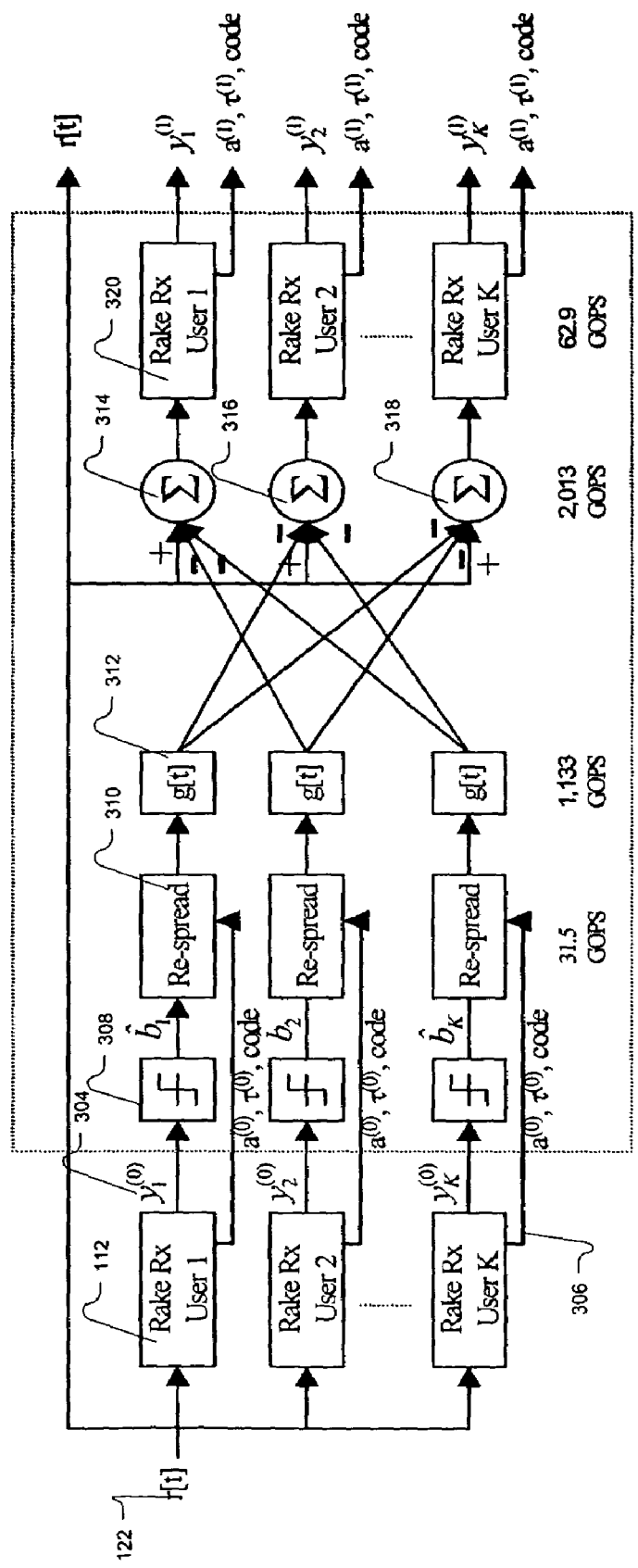
FIGS. 3 and 4 depict methods according to the invention for multiple user detection using explicitly regenerated user waveforms which are added to a residual waveform.

The above equations are implemented in the baseline long-code multiple user detection process as illustrated in FIG. 3. The receiver base-band signal r[t] 122 is input to the rake receiver cards 112 (i.e., one rake receiver for each user) as described above. Each of the rake receivers 112 processes the base-band signal r[t] 122 and outputs the first approximation of the transmitted symbol, $y_k^{(0)}[m]$ 304 for each user k (e.g., user 1 through user K), as well as the estimated amplitude $\hat{\alpha}_{kp}^{(0)}$, time lag $\hat{t}_{kp}^{(0)}$ and user code 306. For ease of notation, here, the superscript refers to the $n^{th}$ regeneration iteration. Hence, for example, $\hat{\alpha}_{kp}^{(0)}$ refers to the baseband because no iterations have been performed.

The $y_k^{(0)}[m]$ 304 output from the rake receiver 112 is input into a detector which outputs hard or soft symbol estimates $\hat{b}_k^{(0)}[m]$ used to cancel the effects of multiple access interference (MAI). One skilled in the art will appreciate that many different detectors may be used, including the hard-limiting (sign function) detector, the null-zone detector, the hyperbolic tangent detector and the linear-clipped detector, and that soft detectors (all but the first listed above) typically yield improved performance.

The outputs from the rake receivers 112 and the soft symbol estimates are input into a respreading process 310 which assembles an estimated spread-spectrum waveform corresponding to the selected user but without pulse shaping. The re-spread signals are input into the raised-cosine filter 312 which produces an estimate of the received spread-spectrum waveform for the selected user.

The raised-cosine pulse shaping process accepts the signals from each of the respread processes (e.g., one for each user), and produces the estimated user waveforms $\hat{r}_k^{(n)}[t]$. Next, the waveforms $\hat{r}_k^{(n)}[t]$ are further processed in a series of summation processes 314, 316, 318 to determine each user's cleaned-up signal $\hat{r}_l^{(n+1)}[t]$ according to the above equation (6).

Therefore, for example, to determine the signal corresponding to the $1^{st}$ user, the baseband signal r[t] 122 from the RF/IF receivers 110 containing information from all simultaneous users is reduced by the estimated signals $\hat{r}_k^{(n)}[t]$ for all users except the $1^{st}$ user. After the subtraction of the $\hat{r}_k^{(n)}[t]$ signals (e.g., $\hat{r}_2^{(n)}[t]$ through $\hat{r}_{K_v}^{(n)}[t]$ as illustrated), the remainder signal contains predominantly the signal for the 1st user. Hence, the summation function 314, applies the above equation (6) to produce the cleaned up signal $\hat{r}_l^{(n+1)}[t]$. This process is performed for each simultaneous user.

The output from the summation processes 314, 316, 318 is supplied to the rake receivers 320 (or re-applied to the original rake receivers 112). The resulting signal produced by the rake receivers 320 is the refined matched-filter detection statistic $y_k^{(1)}[m]$. The superscript (1) indicates that this is the first iteration on the base-band signal. Hence, the base-line long-code multiple user detection is implemented. As illustrated, only one iteration is performed, however, in other embodiments, multiple iterations may be performed depending on limitations (e.g., computational complexity, bandwidth, and other factors).

It can be appreciated by one skilled in the art that the above methods are limited by bandwidth and computational complexity. Specifically, for example, if K=128, i.e., there are 128 simultaneous users for this implementation, the total bisection bandwidth is 998.8 Gbytes/second, determined with the following assumption, for example:

3.84 Mchips/sec/antenna/stream ×2 antennas ×8 samples/chip ×1 bytes/sample ×128 (128−1) streams =998.8 Gytes/sec The computational complexity is calculated in terms of billion operations per second (GOPS), and is calculated separately for each of the processes of re-spreading, raised-cosine filtering, interference cancellation (IC), and the finger receiver operations. The re-spread process involves amplitude-chip-bit multiply-accumulate operations (macs). Assuming, for example, that there are only four possible chips and further that the amplitude chip multiplications are performed via a table look-up requiring zero GOPS, then the re-spread computational complexity is the (amplitude-chip)×(bit macs). Therefore, the re-spread computational cost (in GOPS) is:

3.84 Mchips/sec/antenna/finger/virtual-user/ multiple user detection stage ×2 antennas ×4 fingers ×256 virtual users ×1 multiple user detection stage ×4 ops/chip (real×complex mac) =31.5 GOPS Based on the same assumptions, the raised-cosine filter requires:

3.84 Mchips/sec/antenna/physical-user/multiple user detection stage ×8 samples/chip ×2 antennas ×128 physical users ×1 multiple user detection stage ×6 ops/sample/tap(complex additions then real×complex mac) ×24 taps (using symmetry) =1,132.5 GOPS The computational cost of the IC process is 3.84 Mchips/sec/antenna/physical-user/multiple user detection stage ×8 samples/chip ×2 antennas ×128 physical users ×1 multiple user detection stage ×2 ops/sample/physical users (complex add)) ×128 users =2,013.3 GOPS Finally, the computational complexity for the rake receiver processes is:

3.84 Mchips/sec/antenna/physical-user/multiple user detection stage ×2 antennas ×4 fingers ×256 virtual users ×1 multiple user detection stage ×8 ops/chip (complex mac) =62.9 GOPS Summing the separate computational complexities for each of the above processes yields the following results:

| Process | GOPS |
| --- | --- |
| Re-Spread | 31.5 |
| Raised Cosine Filtering | 1,132.5 |
| IC | 2,013.3 |
| Finger Receivers | 62.9 |
| TOTAL | 3,240.2 |

However, both the bandwidth and computation complexity are reduced by employing a residual-signal implementation as now described. The bandwidth can be reduced by forming the residual signal, which is the difference between the received signal and the total (i.e., all users and all multi-paths) estimated signal. Then, the cleaned-up signal $\hat{r}_l^{(n+1)}[t]$ expressed in terms of the residual signal is:

$$\hat{r}_l^{(n+1)}[t] = r[t] - \sum_{\substack{k=1 \\ k \neq l}}^{K_V} \hat{r}_k^{(n)}[t] = \hat{r}_l^{(n)}[t] + r[t] - \sum_{k=1}^{K_V} \hat{r}_k^{(n)}[t] = \quad (7)$$

$$\hat{r}_l^{(n)}[t] + r_{res}^{(n)}[t]r_{res}^{(n)}[t] \equiv r[t] - \hat{r}^{(n)}[t]\hat{r}^{(n)}[t] \equiv \sum_{k=1}^{K_V} \hat{r}_k^{(n)}[t]$$

Figure 4:
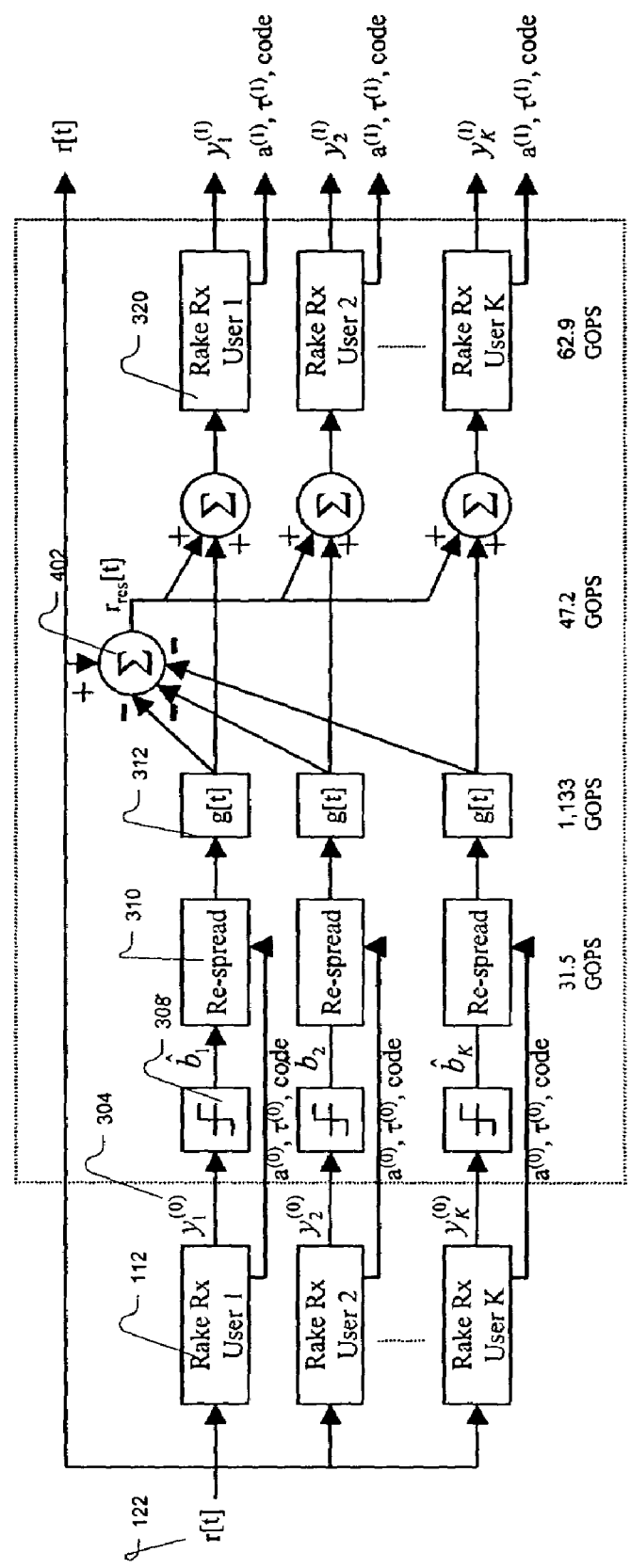

This implementation is illustrated in FIG. 4. One skilled in the art can recognize that through the point of determining the output from the raised-cosine filters, the residual signal implementation is identical with that above illustrated within FIG. 3. It is at this point, the residual signal implementation varies as now described.

A summation process 402 calculates $r_{res}^{(n)}[t]$ according to equation (7) above by accepting the base-band signal r[t] and subtracting the signal $\hat{r}^{(n)}[t]$ (i.e., the output from all of the raised-cosine filters 312).

Differing from the baseline implementation, here, a first summation process 402 is performed by subtracting from the baseband signal r[t] 122 the output from each raised-cosine pulse shaping process 310. This produces the residual signal $r_{res}^{(n)}[t]$ corresponding to the base-band signal and the total (e.g., all users in all multi-paths) estimated signal.

The residual signal $r_{res}^{(n)}[t]$ is supplied to a further summation process for each user (e.g., 404) where the output from that user's raised-cosine pulse shaping process 312 is added to the $r_{res}^{(n)}[t]$ signal as described in above equation (7), thus determining the cleaned-up signal $\hat{r}_l^{(n+1)}[t]$ for each user.

Next, as with the baseline implementation, the cleaned-up signal $\hat{r}_l^{(n+1)}[t]$ for each user is supplied to a rake receiver 320 (or reapplied to 112) for processing into the resultant $y_l^{(n+1)}[m]$ detection statistics ready for processing by the symbol processor 120.

One skilled in the art can recognize that both the bandwidth and computational complexity is improved (i.e., lowered) for this implementation compared with the base-line implementation described above. Specifically, continuing with the assumptions used in determining the bandwidth and computational complexity as above and applying those assumptions to the residual-signal implementation, the bandwidth can be estimated as follows:

3.84 Mchips/sec/antenna/stream ×2 antennas ×8 samples/chip ×1 bytes/sample ×129 streams = 7.9 Gbytes/sec The computational complexity for each of the processes is as follows: the re-spreading and raised-cosine are the same as with the baseline implementation.

For the IC processes, the computational complexity is:

3.84 Mchips/sec/antenna/physical-user/multiple user detection stage ×8 samples/chip ×2 antennas ×128 physical users ×1 multiple user detection stage ×2 ops/sample/waveform addition (complex add)) ×3 waveform additions =47.2 GOPS Finally, the finger receiver processes are the same as with the base-line implementation above. Therefore, summing the separate computational complexities for each of the above processes yields the following results:

| Process | GOPS |
| --- | --- |
| Re-Spread | 31.5 |
| Raised Cosine Filtering | 1,132.5 |
| IC | 47.2 |
| Finger Receivers | 62.9 |
| TOTAL | 1,274.1 |

Therefore, both the bandwidth and computational complexity is improved, however, it can be recognized by one skilled in the art that even with such improvement, the computational complexity may be a limiting factor.

Further improvement is possible and is now described within in the following three embodiments, although other embodiments can be recognized by one skilled in the art. One improvement is to utilize a implicit waveform subtraction rather than the explicit waveform subtraction described for use with both the baseline implementation and the residual long-code implementation above. A considerable reduction in computational complexity results if the individual user waveforms are not explicitly calculated, but rather implicitly calculated.

The illustrated embodiment utilize implicit waveform subtraction by expanding on equation (7) above, and using approximations as shown below in equation (8).

$$y_l^{(n+1)}[m] \equiv \text{Re}\left\{\sum_{q=1}^{L} \hat{a}_{lq}^{(n)H} \frac{1}{2N_l} \sum_{n=0}^{N_l-1} \hat{r}_l^{(n+1)}[nN_c + \hat{\tau}_{lq}^{(n)} + mT_l]c_{\text{Im}}^*[n]\right\} =$$

$$\text{Re}\left\{\sum_{q=1}^{L} \hat{a}_{lq}^{(n)H} \frac{1}{2N_l} \sum_{n=0}^{N_l-1} \hat{r}_l^{(n+1)}[nN_c + \hat{\tau}_{lq}^{(n)} + mT_l]c_{\text{Im}}^*[n]\right\} +$$

-continued $$Re\left\{\sum_{q=1}^{L} \hat{a}_{lq}^{(n)H} \frac{1}{2N_l} \sum_{n=0}^{N_l-1} \hat{r}_{res}^{(n)}[nN_c + \hat{\tau}_{lq}^{(n)} + mT_l]c_{\text{Im}}^*[n]\right\} =$$

$$Re\left\{\sum_{q=1}^{L} \hat{a}_{lq}^{(n)H} \frac{1}{2N_l} \sum_{n=0}^{N_l-1} \left[\sum_{m'}\sum_{q'=1}^{L} \hat{a}_{lq'}^{(n)} s_{\text{Im}'}[nN_c + \hat{\tau}_{lq}^{(n)} - \hat{\tau}_{lq'}^{(n)} + (m-m')T_l]b_l^{(n)}[m']\right]c_{\text{Im}}^*[n]\right\} + y_{res}^{(n)}[m] \cong$$

$$Re\left\{\sum_{q=1}^{L} \hat{a}_{lq}^{(n)H} \frac{1}{2N_l} \sum_{n=0}^{N_l-1} \left[\sum_{q'=1}^{L} \hat{a}_{lq'}^{(n)} s_{\text{Im}}[nN_c + \hat{\tau}_{lq}^{(n)} - \hat{\tau}_{lq'}^{(n)}]\right]c_{\text{Im}}^*[n]\right\} \cdot$$

$$\hat{b}_l^{(n)}[m] + y_{res,l}^{(n)}[m] =$$

$$Re\left\{\sum_{q=1}^{L}\sum_{q'=1}^{L} \hat{a}_{lq}^{(n)H} \hat{a}_{lq'}^{(n)} \frac{1}{2N_l} \sum_{n=0}^{N_l-1} s_{\text{Im}}[nN_c + \hat{\tau}_{lq}^{(n)} - \hat{\tau}_{lq'}^{(n)}]c_{\text{Im}}^*[n]\right\}\hat{b}_l^{(n)}[m] +$$

$$y_{res,l}^{(n)}[m] \cong Re\left\{\sum_{q=1}^{L} \hat{a}_{lq}^{(n)H} \hat{a}_{lq}^{(n)}\right\} \cdot \hat{b}_l^{(n)}[m] + y_{res,l}^{(n)}[m] =$$

$$A_l^{(n)2} \cdot \hat{b}_l^{(n)}[m] + y_{res,l}^{(n)}[m]A_l^{(n)2} \equiv Re\left\{\sum_{q=1}^{L} \hat{a}_{lq}^{(n)H} \hat{a}_{lq}^{(n)}\right\}y_{res,l}^{(n)}[m] \equiv$$

$$Re\left\{\sum_{q=1}^{L} \hat{a}_{lq}^{(n)H} \cdot \frac{1}{2N_l} \sum_{n=0}^{N_l-1} r_{res}^{(n)}[nN_c + \hat{\tau}_{lq}^{(n)} + mT_l] \cdot c_{\text{Im}}^*[n]\right\}$$

The two approximations used, as indicated within equation (8), include neglecting intersymbol interference terms for the user of interest, and further, neglecting cross-multipath interference terms for the user of interest. Because the user of interest term has a strong deterministic term, the omissions of these low-level random contributions is justified. These contributions could be included in a more detailed embodiment without incurring excessive increases in computational complexity. However, implementations computational complexity would increase somewhat. Such an embodiment may be appropriate for high data-rate, low spreading factor users where inter-symbol and cross multipath term per larger.

A noteworthy aspect of equation (8) above is that the rake receiver operation on the estimated user of interest signal $\hat{r}_l^{(n)}[t]$ can be calculated analytically. Thus, the signal need not be explicitly formed, but rather, the corresponding contribution is added after the rake receiver operation on the residual signal alone. Now referring to FIG. 5, this implicit waveform subtraction implementation is illustrated.

One skilled in the art can glean from the illustration that separate re-spreading and raised-cosine processing is no longer performed on each individual user signal, but rather, is performed only once on the baseband composite re-spread signal $\rho^{(n)}[t]$. Thus, the re-spread process 310 accumulates the composite signal $\rho^{(n)}[t]$ based on the amplitudes $\hat{\alpha}_{kp}^{(n)}$, time lags $\hat{\tau}_{kp}^{(n)}$ and user codes. The output from the re-spreading process produces another composite signal $\hat{r}^{(n)}[t]$ 502 as described below and in equation (9).

At this point, it is of note that a substantial reduction in computational complexity accrues due to not having to explicitly calculate the individual user estimated waveforms.

Figure 5:
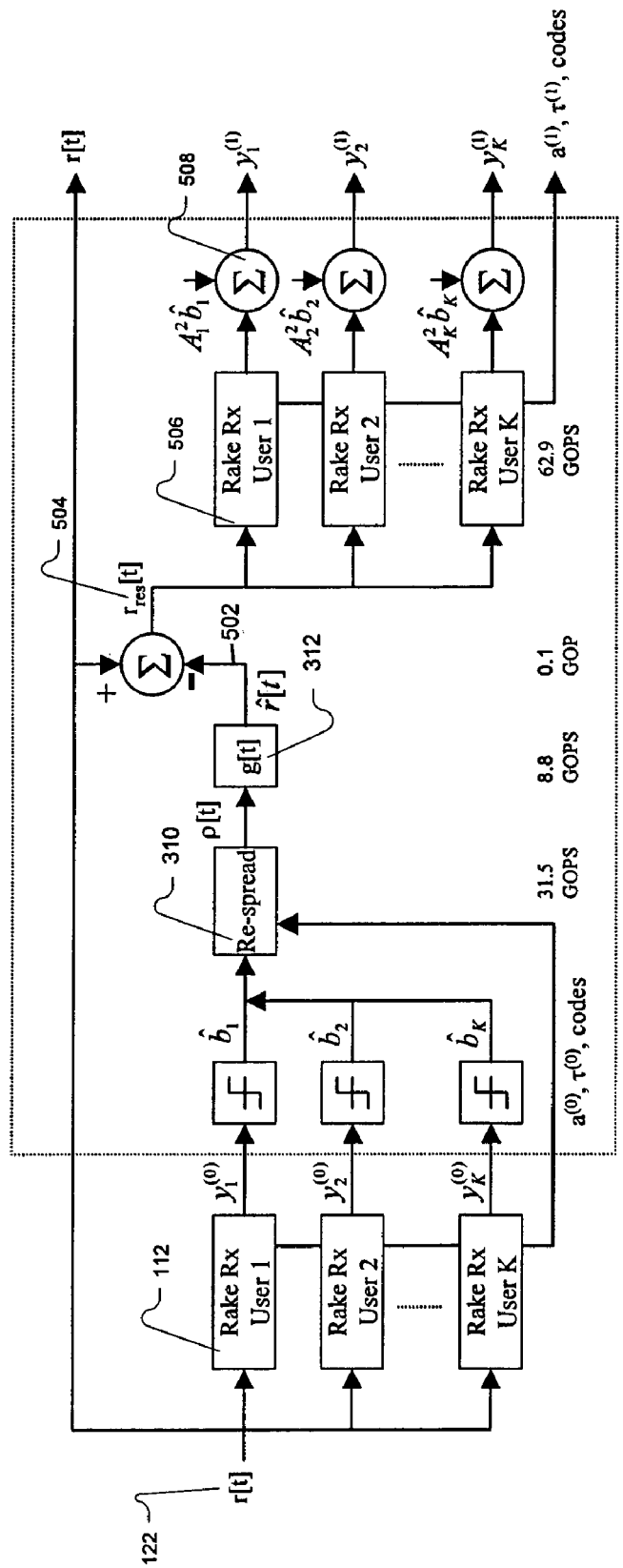
FIG. 5 depicts methods according to the invention for multiple user detection in which user waveforms are regenerated from a composite spread-spectrum pulsed-shaped waveform.

As illustrated in FIG. 5, the individual user waveforms are not required, hence, the composite signal $\rho^{(n)}[t]$ 502 representing the sum of all estimated user waveforms can be formed by calculating this composite waveform first without performing the raised-cosine filtering process on each individual waveform. Only one filtering operation need be performed, which represents a substantial reduction in computational complexity.

The form of $\rho^{(n)}[t]$ is as follows:

$$\rho^{(n)}[t] = \sum_{k=1}^{K_v}\sum_{p=1}^{L}\sum_{r} \delta[t - \hat{\tau}_{kp}^{(n)} - rN_c] \cdot \hat{a}_{kp}^{(n)} \cdot c_k[r] \cdot \hat{b}_k^{(n)}[\lfloor r/Nk \rfloor]\hat{r}^{(n)}[t] = \quad (9)$$

$$\sum_r g[r]\rho^{(n)}[t-r]$$

Now that an understanding of the composite waveform $\rho^{(n)}[t]$ is accomplished, referring back to FIG. 5, this waveform is transformed into $\hat{r}^{(n)}[t]$ via the raised-cosine pulse shaping filter 312. From here, a summation process 506 subtracts $\hat{r}^{(n)}[t]$ from the base-line waveform r[t] producing the residual waveform $r_{res}^{(n)}[t]$ as shown above (e.g., in equation (7)).

Unlike the residual signal implementation described above, here, the $r_{res}^{(n)}[t]$ is applied directly to the rake receivers 506 (or reapplied to the rake receivers 112) for each user together with the user code for that user. The output from each rake receiver is applied to a summation process, where the $A_l^{(n)2} \cdot \hat{b}_l^{(n)}[m]$ values are added to the rake receiver output as described above in equation (8) producing the $y_l^{(n+1)}[m]$ detection statistics suitable for symbol processing 120.

The computational complexity of this embodiment is reduced as now described. The re-spread processing and rake receiver computational costs are the same as with the previous implementations. However, the raise-cosine filtering and interference cancellation computational cost is now:

For the raised-cosine filtering, 3.84 Mchips/sec/antenna/multiple user detection stage ×8 samples/chip ×2 antennas ×1 multiple user detection stage ×6 ops/sample (complex addition then real×complex mac) ×24 taps (using symmetry) =8.8 GOPS The computational cost of the IC process is 3.84 Mchips/sec/antenna/multiple user detection stage ×8 samples/chip ×2 antennas ×1 multiple user detection stage ×2 ops/sample/waveform addition (complex add) ×1 waveform addition = 0.123 GOPS Summing the separate computational complexities for each of the above processes yields the following results:

| Process | GOPS |
| --- | --- |
| Re-Spread | 31.5 |
| Raised Cosine Filtering | 8.8 |
| IC | 0.1 |
| Finger Receivers | 62.9 |
| TOTAL | 103.3 |

Another embodiment using matched-filter outputs rather than antenna streams is now presented. This embodiment follows from equation (8) above where the rake receiver outputs are:

$$y_{res,l}^{(n)}[m] \equiv \text{Re}\left\{\sum_{q=1}^{L} \hat{a}_{lq}^{(n)H} \cdot \frac{1}{2N_l} \sum_{n=0}^{N_l-1} r_{res}^{(n)}[nN_c + \hat{\tau}_{lq}^{(n)} + mT_l] \cdot c_{lm}^*[n]\right\} \quad (10)$$

and further user equation (7) above, equation (10) can be re-written as:

$$y_{res,l}^{(n)}[m] \equiv \text{Re}\left\{\sum_{q=1}^{L} \hat{a}_{lq}^{(n)H} \cdot \frac{1}{2N_l} \sum_{n=0}^{N_l-1} r_{res}^{(n)}[nN_c + \hat{\tau}_{lq}^{(n)} + mT_l] \cdot c_{lm}^*[n]\right\} = \quad (11)$$

$$\text{Re}\left\{\sum_{q=1}^{L} \hat{a}_{lq}^{(n)H} \cdot \frac{1}{2N_l} \sum_{n=0}^{N_l-1} r[nN_c + \hat{\tau}_{lq}^{(n)} + mT_l] \cdot c_{lm}^*[n]\right\} -$$

$$\text{Re}\left\{\sum_{q=1}^{L} \hat{a}_{lq}^{(n)H} \cdot \frac{1}{2N_l} \sum_{n=0}^{N_l-1} \hat{r}^{(n)}[nN_c + \hat{\tau}_{lq}^{(n)} + mT_l] \cdot c_{lm}^*[n]\right\} =$$

$$y_l^{(n)}[m] - \text{Re}\left\{\sum_{q=1}^{L} \hat{a}_{lq}^{(n)H} \cdot \frac{1}{2N_l} \sum_{n=0}^{N_l-1} \hat{r}^{(n)}[nN_c + \hat{\tau}_{lq}^{(n)} + mT_l] \cdot c_{lm}^*[n]\right\}$$

and then, combining equation (11) with equation (8) yields:

$$y_l^{(n+1)}[m] = A_l^{(n)2} \cdot \hat{b}_l^{(n)}[m] + y_l^{(n)}[m] - \quad (12)$$

$$\text{Re}\left\{\sum_{q=1}^{L} \hat{a}_{lq}^{(n)H} \cdot \frac{1}{2N_l} \sum_{n=0}^{N_l-1} \hat{r}^{(n)}[nN_c + \hat{\tau}_{lq}^{(n)} + mT_l] \cdot c_{lm}^*[n]\right\}$$

This embodiment improves the above approaches in that the antenna streams do not need to be input into the multiple user detection process, however, it is not possible to re-estimate the channel amplitudes.

Figure 6:
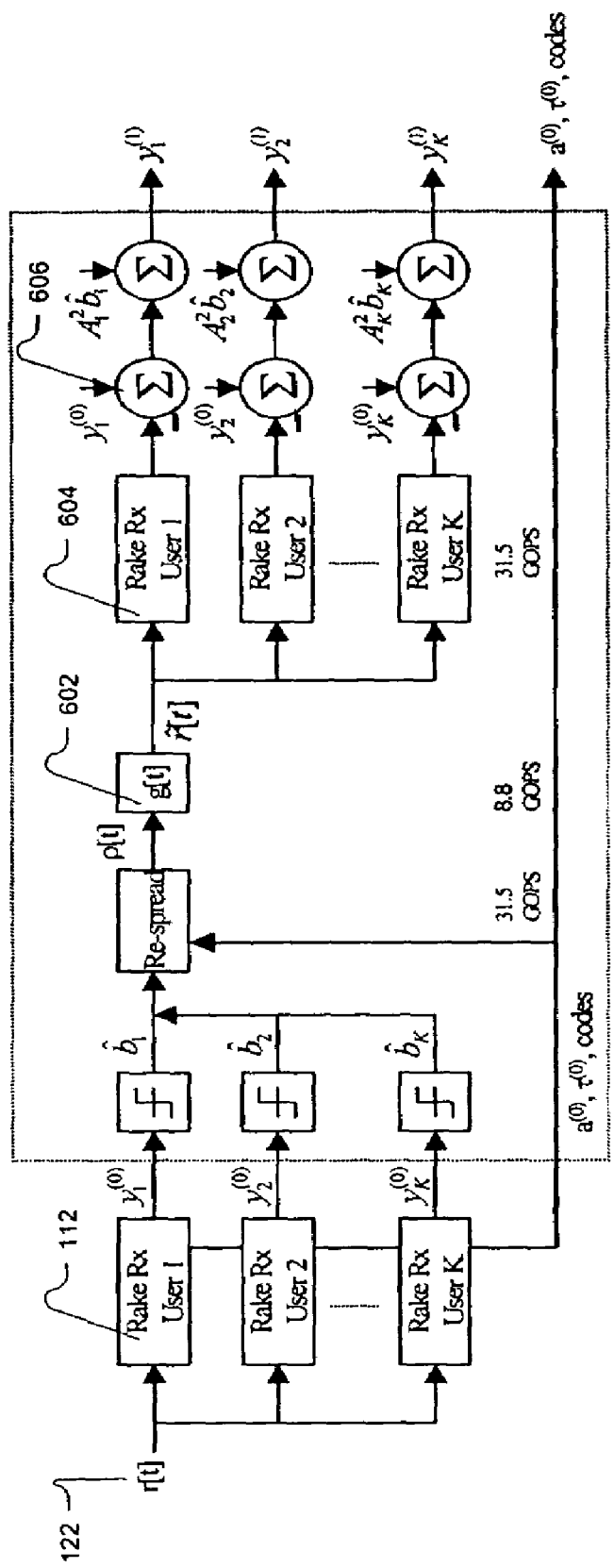
FIG. 6 depicts methods according to the invention for multiple user detection using matched-filter outputs where a composite spread-spectrum pulse-shaped waveform is rake-processed.

Referring to FIG. 6, an illustration of the matched-filter output embodiment is illustrated. As illustrated, the processing of the baseband r[t] waveform is accomplished as described in FIG. 5 above, and further, $\rho^{(n)}[t]$ is determined in accordance with the equation (9) and is applied to the raised-cosine pulse shaping process 602.

Differing from the above embodiment, however, there is no summation process before applying $\hat{r}^{(n)}[t]$ of the second rake receiver process 604. Rather, $\hat{r}^{(n)}[t]$ is applied directly to the rake receiver process 604. The output from the rake receivers 604 is subtracted 606 from the output $y_l^{(n)}[m]$ from the first rake receivers 112. This difference is then added to the $A_l^{(n)2} \cdot \hat{b}_l^{(n)}[m]$ value to produce $y_l^{(n+1)}[m]$. This process is described within the above equations (11) and (12).

The computational complexity is reduced because there is no longer an explicit interference canceling (IC) operation, and thus, the interference canceling computational cost is zero. The rake receiver computational cost is half the previous embodiment's value because now the re-estimate of the amplitudes cannot be performed, and there is no need to cancel interference on the dedicated physical control channel (DPCCH). Therefore, the computational cost is:

| Process | GOPS |
|---|---|
| Re-Spread | 31.5 |
| Raised Cosine Filtering | 8.8 |
| IC | 0.0 |
| Finger Receivers | 31.5 |
| TOTAL | 71.8 |

Another embodiment using matched-filter outputs obtained before the maximal ratio combination (MRC) is now described. The pre-MRC rake matched-filter outputs can be described as:

$$y_{lq}^{(0)}[m] = \frac{1}{2N_l} \sum_{n=0}^{N_l-1} r[nN_c + \hat{\tau}_{lq}^{(0)} + mT_l] \cdot c_{lm}^*[n] \quad (13)$$

The same detection statistics based on the cleaned up signal $\hat{r}_l^{(n+1)}[t]$ is $$y_{lq}^{(n+1)}[m] = \frac{1}{2N_l} \sum_{n=0}^{N_l-1} \hat{r}_l^{(n+1)}[nN_c + \hat{\tau}_{lq}^{(0)} + mT_l] \cdot c_{lm}^*[n] \quad (14)$$

Now from Equation (7), $$\hat{r}_l^{(n+1)}[t] = \hat{r}_l^{(n)}[t] + r[t] - \hat{r}^{(n)}[t] \quad (15)$$

Hence the first-stage pre-MRC matched-filter outputs can be re-written:

$$y_{lq}^{(n+1)}[m] = \frac{1}{2N_l} \sum_{n=0}^{N_l-1} \hat{r}_l^{(n+1)}[nN_c + \hat{\tau}_{lq}^{(0)} + mT_l] \cdot c_{lm}^*[n] \quad 16$$

$$= \frac{1}{2N_l} \sum_{n=0}^{N_l-1} \hat{r}_l^{(n)}[nN_c + \hat{\tau}_{lq}^{(0)} + mT_l] \cdot c_{lm}^*[n]$$

$$+ \frac{1}{2N_l} \sum_{n=0}^{N_l-1} r[nN_c + \hat{\tau}_{lq}^{(0)} + mT_l] \cdot c_{lm}^*[n]$$

$$- \frac{1}{2N_l} \sum_{n=0}^{N_l-1} \hat{r}^{(n)}[nN_c + \hat{\tau}_{lq}^{(0)} + mT_l] \cdot c_{lm}^*[n]$$

$$= \hat{a}_{lq}^{(n)} \cdot \hat{b}_l^{(n)}[m] + y_{lq}^{(n)}[m] - y_{est,lq}^{(n)}[m]$$

$$y_{est,lq}^{(n)}[m] \equiv \frac{1}{2N_l} \sum_{n=0}^{N_l-1} \hat{r}^{(n)}[nN_c + \hat{\tau}_{lq}^{(0)} + mT_l] \cdot c_{lm}^*[n]$$

where the following approximation has been used, $$y_{lq,1}^{(n+1)}[m] \equiv \frac{1}{2N_l} \sum_{n=0}^{N_l-1} \hat{r}_l^{(n)}[nN_c + \hat{\tau}_{lq}^{(0)} + mT_l] \cdot c_{lm}^*[n] \cong \hat{a}_{lq}^{(n)} \cdot \hat{b}_l^{(n)}[m] \quad (17)$$

Given the pre-MRC matched-filter outputs the re-estimated channel amplutides are $$\hat{a}_{lq}^{(n+1)} \equiv \sum_{s} w[s] \cdot \frac{1}{N_p} \sum_{m=0}^{N_p-1} y_{lq}^{(n+1)}[m + Ms] \cdot \hat{b}_l^{(n)}[m + Ms] \quad (18)$$

where
   w[s] is a filter,
   $N_p$ is a number of symbols, and
   M is a number of symbols per slot,
and the post-MRC matched-filter outputs are then $$y_l^{(n+1)}[m] \equiv \text{Re}\left\{\sum_{q=1}^{L} \hat{a}_{lq}^{(n+1)H} \cdot y_{lq}^{(n+1)}[m]\right\} \quad (19)$$

Figure 7:
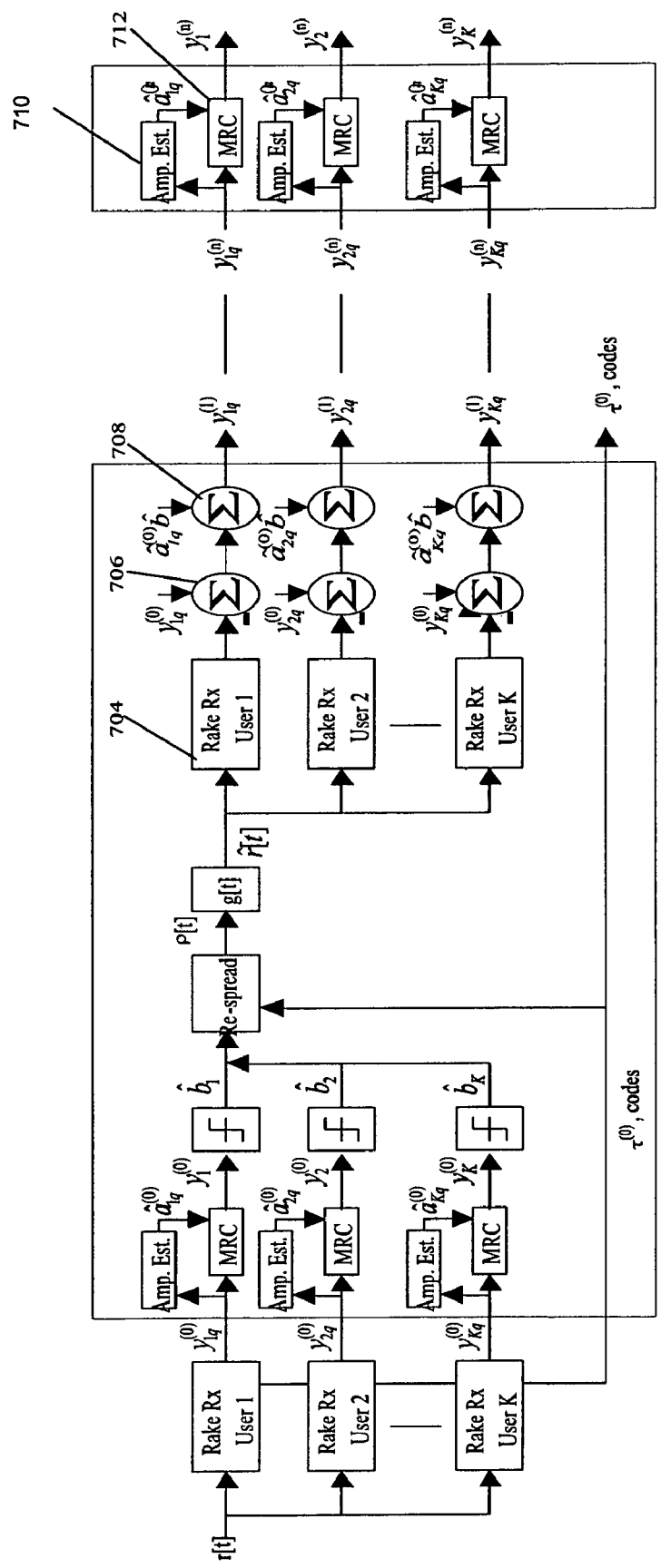
FIG. 7 depicts methods according to the invention for multiple user detection using pre-maximum ratio combined matched-filter output, where a composite spread-spectrum pulse-shaped waveform is rake processed.

This embodiment is illustrated in FIG. 7. Here, the $y_{lq}^{(0)}[m]$ detection statistics are produced as with the above embodiments, however, before being applied to the MCR, the estimated amplitude $\hat{\alpha}_{lq}^{(0)}$ is determined first. Next, the MCR produces the $y_l^{(0)}[m]$ detection statistics which are from the amplitudes $\hat{\alpha}_{lq}^{(0)}$ and the pre-combination matched filter detection statistics $y_{lq}^{(0)}[m]$ as in Equation (19) above.

The $\hat{r}[t]$ waveform is applied (or reapplied) to a rake receiver 704. The output from the rake receiver 704 is subtracted 706 from the $y_{lq}^{(0)}[m]$ detection statistics. Next, the difference from the subtraction 706 is summed 708 with the $\hat{\alpha}_{lq}^{(0)} \cdot b_1^{(0)}[m]$ value, thus producing $y_{lq}^{(1)}[m]$ in according with equation (19) above.

After n iterations are performed, the $y_{lq}^{(n)}$ detection statistics for each of the user corresponding to each antenna has been determined. The detection statistics for each user, $y_l^{(n)}$ is next determined via estimating the complex amplitudes 710 across the Q channels for the user, and performing a maximum ratio combination 712 using those amplitudes.

It is helpful to understand that although the computational complexity increased, here, it is possible to re-estimate channel amplitudes, and hence, cancel interference on the dedicated physical control channels (DPCCH). The computational complexity of this embodiment is:

| Process | GOPS |
| --- | --- |
| Re-Spread | 31.5 |
| Raised Cosine Filtering | 8.8 |
| IC | 0.0 |
| Finger Receivers | 62.9 |
| TOTAL | 103.2 | which is still within a practical range.

Therefore, as shown in all the embodiments above, and other non-illustrated embodiments, methods for performing multiple user detection are illustrated.

Figure 8:
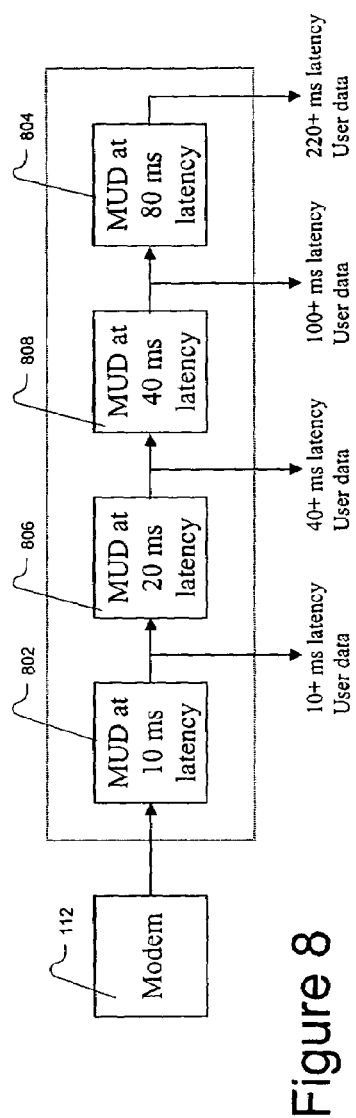
FIG. 8 depicts an approach for processing user waveforms using full or partial decoding at various time-transmission intervals based on user class.

Turning now to software implementations for the above, one of several implementations is designed to allow full or partial decoding of the users at various transmission time intervals (TTIs) within the multiple user detection (MUD) iterative loop. The approach, illustrated in FIG. 8, allows users belonging to different classes (e.g., voice and data) to be processed with different latencies. For example, voice users could be processed with a 10+ ms latency 802, whereas data users could be process with a 80+ ms latency 804. Alternately, voice users could be processed with a 20+ms latency 806 or a 40+ ms latency 808, so as to include voice decoding in the MUD loop. Other alternatives are possible depending on the implementation and limitations of the processing requirements.

If a particular data user is to be processed with an 80+ ms latency 804 so as to include the full turbo decode within the MUD loop then the input channel bit-error rate (BER) pertaining to these users might be extraordinarily high. Here, the MUD processing might be configured so as to not include any cancellation of the data users within the 10+ ms latency 802. These data users would then be cancelled in the 20+ ms latency 806 period. For this cancellation it could be opted to perform MUD only on data users. The advantage of canceling the voice users in the first latency range (e.g., first box) would still benefit the second latency range processing.

Alternatively, the second box 806 could perform cancellation on both voice and data users. The reduced voice channel bit-error rate would not benefit the voice users, whose data has already been shipped out to meet the latency requirement, but the reduced voice channel BER would improve the cancellation of voice interference from the data users. In the case that voice and data users are cancelled in the second box 806, another, possible configuration would be to arrange the boxes in parallel. Other reduced-latency configurations with mixed serial and parallel arrangements of the processing boxes are also possible.

Depending on the arrangement chosen, the performance for each class of user will vary. The approach above tends to balance the propagation range for data and voice users, and the particular arrangement can be chosen to tailor range for the various voice and data services.

Each box is the same code but configured differently. The parameters that differ are:
   N_FRAMES_RAKE_OUTPUT;
   Decoding to be performed (e.g., repetition decoding, turbo decoding, and the like);
   Classes of users to be cancelled;
   Threshold parameters.

The pseudo code for the software implementation of one long-code multiple user detection processing box is as follows:

```
Initialize
   Zero data
   Generate OVSF codes
         Generate raised cosine pulse
   Allocate memory
   Open rake output files
   Open mod output files
   Align mod data
Main Frame Loop {
   Determine number of physical users
   Read_in_rake_output_records (N frames)
   Reformat_rake_output_data (N frames at a time)
   for stage = 1 : N_stages
      Perform appropriate decoding(SRD, turbo, and the like,
         depending on TTI)
      Perform_long_code_mud
   end
}
Free memory
```

The following four functions are described below:
Read_in_rake_output_records;
Reformat_rake_output_data
Perform appropriate decoding (SRD, turbo, and the like, "depending on TTI);
Perform_long_code_mud.
The Read_in_rake_output_records function performs:
Reading in data for each user; and
Assigning data structure pointers.
The rake data transferred to MUD is associated with structures of type Rake_output_data_type. The elements of this structure are given in Table 1. There is a parameter N_FRAMES_RAKE_OUTPUT with values {1, 2, 4, 8} that specifies the number of frames to be read-in at a time. The following table tabulates the Structure Rake_output_buf_type elements:

| Element Type | Name |
|---|---|
| unsigned long | Frame_number |
| unsigned long | physical_user_code_number |
| int | physical_user_tfci |
| int | physical_user_sf |
| int | physical_user_beta_c |
| int | physical_user_beta_d |
| int | N_dpdchs |
| int | compressed_mode_flag |
| int | compressed_mode_frame |
| int | N_first |
| int | TGL |
| int | slot_format |
| int | N_rake_fingers |
| int | N_antennas |
| unsigned long | mpath_offset[N_ANTENNAS] |
| unsigned long | tau_offset |
| unsigned long | y_offset |
| COMPLEX* | mpath[N_ANTENNAS] |
| unsigned long* | tau_hat |
| float* | y_data |

It is helpful to describe several structure elements for a complete understanding. The element slot_format is an integer from 0 to 11 representing the row in the following table (DPCCH fields), 3GPP TS 25.211. By way of non-limiting example, when slot_format=3, it maps to the fourth row in the table corresponding to slot format 1 with 8 pilot bits and 2 TPC bits. The offset values (e.g. tau_offset) give the location in memory relative to the top of the structure where the corresponding data is stored. These offset values are used for setting the corresponding pointers (e.g., tau_hat). For example, if Rbuf is a pointer to the structure then:

Rbuf→tau_hat=(unsigned long*)((unsigned long) Rbuf+Rbuf→tau_offset);

is used to set the tau_hat pointer.

The rake output structure associated data (mpath, tau_hat and y_data) is ordered as follows:

| | |
|---|---|
| mpath[n][q + s * L] | = amplitude data |
| tau_hat[q] | = delay data |
| y_data[ 0 + m * M ] | = DPCCH data for symbol period m |
| y_data[ 1+j+(d−1)*J + m * M ] | = dth DPDCH data for symbol period m | where

| | |
|---|---|
| n | = antenna index (0 : Na−1) |
| q | = finger index (0 : L−1) |
| s | = slot index (0 : Nslots−1) |
| m | = symbol index (0 : 149) |
| j | = bit index (0 : J−1) |
| d | = DPDCH index (1 : Ndpdchs) |
| Na | = N_ANTENNAS |
| L | = N_RAKE_FINGERS_MAX |
| Nslots | = N_SLOTS_PER_FRAME = 15 |
| J | = 256/SF |
| M | = 1 + J * Ndpdchs. |

The memory required for the rake output buffers is dominated by the y-data memory requirement. The maximum memory requirement for a user is Nsym * (1+64*6) floats per frame, where Nsym=150 is the number of symbols per frame. This corresponds to 1 DPCCH at ST 256 and 6 DPDCHs at SF 4. If 128 users are all allocated to this memory then possible memory problems arise. To minimize allocation problems, the following table gives the maximum number of user that the MUD implementation will be designed to handle at a given SF and Ndpdchs.

| SF | Ndpdchs | Number users | Bits per symbol | Mean bits per symbol |
|---|---|---|---|---|
| 256 | 1 | 256 | 2 | 4.0 |
| 128 | 1 | 192 | 3 | 4.5 |
| 64 | 1 | 128 | 5 | 5.0 |
| 32 | 1 | 96 | 9 | 6.8 |
| 16 | 1 | 64 | 17 | 8.5 |
| 8 | 1 | 32 | 33 | 8.3 |
| 4 | 1 | 16 | 65 | 8.1 |
| 4 | 2 | 12 | 129 | 12.1 |
| 4 | 3 | 8 | 193 | 12.1 |
| 4 | 4 | 4 | 257 | 8.0 |
| 4 | 5 | 3 | 321 | 7.5 |
| 4 | 6 | 2 | 385 | 6.0 |

In the proceeding table, the Bits per symbol=1+(256/SF)* N_DPDCHs, Mean bits per symbol=(Number users)*(Bits per symbol)/128, and Ndpdchs=Number DPDCHs.

From the above table it is noted that the parameter specifying the mean number of bits per symbol be set to MEAN_BITS_PER_SYMBOL=16. The code checks to see if the physical users specifications are consistent with this memory allocation. Given this specification, the following are estimates for the memory required for the rake output buffers.

| Data | Type | Size | Count | Count | Bytes |
|---|---|---|---|---|---|
| Rake_output_buf | Structure | 88 | 1 | 1 | 88 |
| mpath | COMPLEX | 8 | Lmax * Nslots * Na | 240 | 1,920 |
| tau | int | 4 | Lmax | 8 | 32 |
| y | float | 4 | Nsym * Nbits | 2400 | 9,600 |
| y_Iq | COMPLEX | 8 | Nsym * Nbits * Lmax * Na | | 307,200 |
| Total bytes per user per frame | | | | | 318,840 |
| Total bytes for 128 users and 9 frames | | | | | 367 Mbytes |

Where Count is the per physical user per frame, assuming numeric values based on

| | | |
|---|---|---|
| Lmax | = N_RAKE_FINGERS_MAX | =8 |
| Nslots | = N_SLOTS_PER_FRAME | =15 |
| Na | = N_ANTENNAS | =2 |
| Nsym | = N_SYMBOLS_PER_FRAME | =150 |
| Nbits | = MEAN_BITS_PER_SYMBOL | =16 |

The location of each structure is stored in an array of pointers

Rake_output_buf[User+Frame_idx * N_USERS_MAX]

where Frame_idx varies from 0 to N_FRAMES_RAKE_OUTPUT inclusive. Frame 0 is initially set with zero data. After all frames are processed, the structure and data corresponding to the last frame is copied back to frame 0 and N_FRAMES_RAKE_OUTPUT new structures and data are read from the input source.

The Reformat_rake_output_data function performs:
Combining of multi-path data across frame boundaries;
Determines number of rake fingers for each MUD processing frame
Filling virtual-user data structures
Separates DPCHs into virtual users
Determines chip and sub-chip delays for all fingers
Determines the minimum SF and maximum number of DPDCHs for each user
Reformats user b-data to correspond to the minimum SF
Reformats rake data to be linear and contiguous in memory.

Interference cancellation is performed over MUD processing frames. Due to multi-path and asynchronous users, the MUD processing frame will not correspond exactly with the user frames. MUD processing frames, however, are defined so as to correspond as closely as possible to user frames. It is preferable for MUD processing that the number of multi-path returns be constant across MUD processing frames. The function of multi-path combining is to format the multi-path data so that it appears constant to the long-code MUD processing function. Each time after N=N_FRAMES_RAKE_OUTPUT frames of data is read from the input source the combining function is called.

Figure 9:
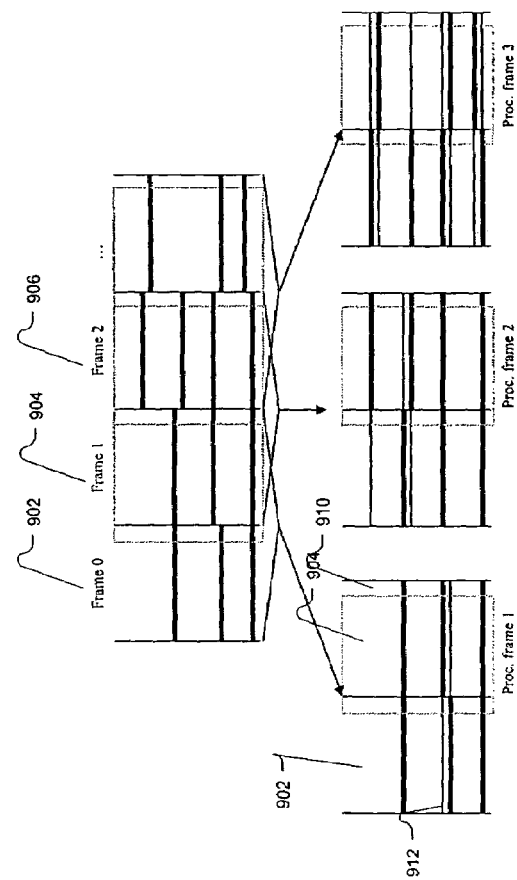
FIG. 9 depicts an approach for combining multi-path data across received frame boundaries to preserve the number of multi user detection processing frame counts.

FIG. 9 shows a hypothetical set of multi-path lags corresponding to several frames of user data 902. Also shown are the corresponding MUD processing frames 904. Notice that MUD processing frame k overlaps with user frames k-1 and k. For example, processing frame 1 904 overlaps with user frame 0 902, and further, overlaps with user frame 1 904. The MUD processing frame is positioned so that this is true for all multi-paths of all users. A one-symbol period corresponds to a round trip for a 10 km radius cell. Hence even large cells are typically only a few symbols asynchronous.

The multi-path combining function determines all distinct delay lags from user frames k-1 and k. Each of these lags is assigned as a distinct multi-path associated with MUD processing frame k, even if some of the distinct lags are obviously the same finger displaced in delay due to channel dynamics. The amplitude data for a finger that extends into a frame where the finger wasn't present is set to zero. The illustrated thin lag-lines (e.g., 912) represent finger amplitude data that is set to zero. After the tentative number of fingers is assessed in this way, the total finger energy that falls within the MUD processing frame is assessed for each tentative finger and the top N_RAKE_FINGERS_MAX fingers are assigned. In the assignment of fingers the finger indices for fingers that were active in the previous MUD processing frame are kept the same so as not to drop data.

The user SF and number of DPDCHs can change every frame. It is helpful for efficient MUD processing that the user SF and number of DPDCHs be constant across MUD processing frames. This function, Reformat_rake_data formats the user b-data so that it appears constant to the long-code MUD processing function. Each time after N=N_FRAMES_RAKE_OUTPUT frames of data is read from the input source this function is called. The function scans the N frames of rake output data and determined for each user the minimum SF and maximum number of DPDCHs. Virtual users are assigned according to the maximum number of DPCHs. If for a given frame the user has fewer DPCH the corresponding b-data and a-data are set to zero.

Note that this also applies to the case where the number of DPDCHs is zero due to inactive users, and also to the case where the number of DPDCHs is zero due to compressed mode. It is anticipated that the condition of multiple DPDCHs will not often arise due to the extreme use of spectrum. If for a given frame the SF is greater than the minimum the b-data is expanded to correspond to the lower SF. That is, for example, if the minimum SF is 4, but over some frames that SF is 8, then each SF-8 b-data bit is replicated twice so as to look like SF-4 data. Before the maximum ratio combination (MRC) operation the y-data corresponding to expanded b-data is averaged to yield the proper SF-8 y-data.

Figure 10:
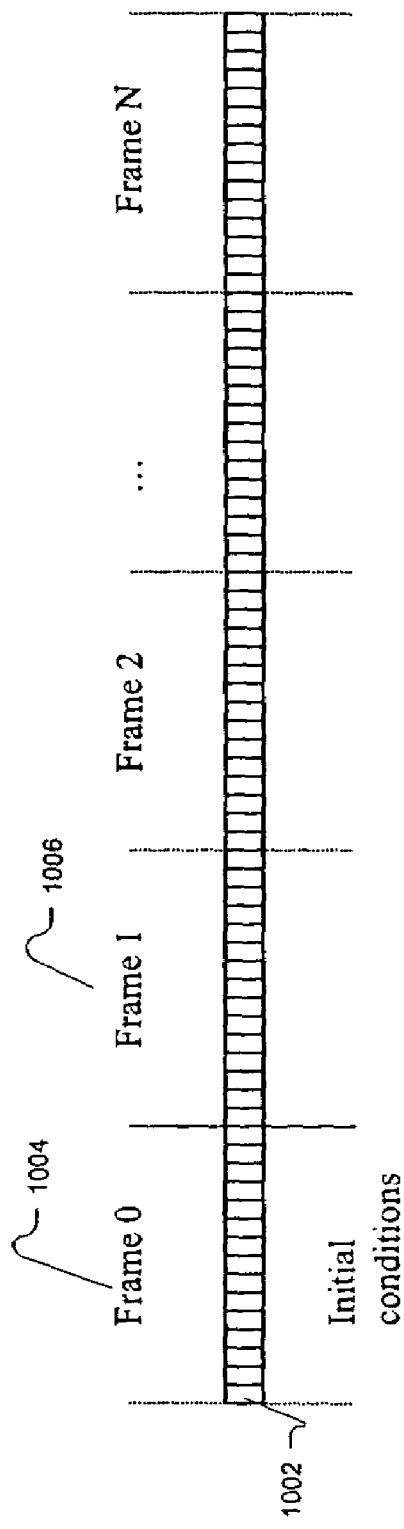
FIG. 10 illustrates the mapping of rake receiver output to virtual to preserve spreading factor and number of data channels across multiple user detection processing frames where the data is linear and contiguous in memory.

FIG. 10 shows how rake output data is mapped to (virtual) user data structures. Each small box (e.g., 1002) in the figure represents a slot's-worth of data. For DPCCH y-data or b-data, for example, each box would represent 150 values. Data is mapped so as to be linear in memory and contiguous frame to frame for each antenna and each finger. The reason for this mapping is that data can easily be accessed by adjusting a pointer. A similar mapping is used for other data except the amplitude data, where it would be imprudent to attempt to keep the number of fingers constant over a time period of up to 8 frames. For the virtual-user code data there are generally 38,400 data items per frame; and for the b-data and y-data there are generally 150×256/SF data items per frame.

Note that for pre-MRC y-data, the mapping is linear and contiguous in memory for each antenna and each finger. Each DPCH is mapped to a separate virtual user data structure. The initial conditions data (frame 0 1004) is initially filled with zero data (except for the codes). After frame N data is written, this data is copied back to frame 0 1004, and the next frame of data that is written is written to frame 1 1006. For all data types the 0-index points to the first data item written to frame 0 1004. For example, the initial-condition b-data (frame 0) for an SF 256 virtual user is indexed b[0], b[1], . . . , b[149], and the b-data corresponding to frame 1 is b[150], b[151], . . . , b[299].

Four indices are of interest: chip index, bit index, symbol index, and slot index. The chip index r is always positive. All indices are related to the chip index. That is, for chip index r we have

| Chip index | = r |
|---|---|
| Bit index | = r/Nk |
| Symbol index | = r/256 |
| Slot index | = r/2560 | where Nk is the spreading factor for virtual user k.

The elements for the (virtual) user data structures are given in the following table along with the memory requirements.

| Element Type | Name | Bytes | Bytes |
|---|---|---|---|
| int | Dpch_type | 4 | 4 |
| int | Sf | 4 | 4 |
| int | log2Sf | 4 | 4 |

-continued

| Element Type | Name | Bytes | Bytes |
|---|---|---|---|
| float | Beta | 4 | 4 |
| int | Mrc_bit_idx | 4 | 4 |
| int | N_bits_per_dpch | 4 | 4 |
| int | N_rake_fingers[Nf] | 4*8 | 32 |
| int | Chip_idx_rs[Lmax] | 4*8 | 32 |
| int | Chip_idx_ds[Lmax] | 4*8 | 32 |
| int | Delay_lag[Lmax] | 4*8 | 32 |
| int | finger_idx_max_lag | 4 | 4 |
| int | Chip_delay[Lmax] | 4*8 | 32 |
| int | Sub_chip_delay[Lmax] | 4*8 | 32 |
| COMPLEX | axcode[Nf][Na][Lmax][Nslots * 2][4] | 8*8*2*8*15*2*4 | 122880 |
| COMPLEX | a_hat_ds[Nf][Na][Lmax][Nslots * 2] | 8*8*2*8*15*2 | 30720 |
| COMPLEX* | mf_ylq[Na][Lmax] | 4*2*8 | 64 |
| COMPLEX* | mud_ylq[Na][Lmax] | 4*2*8 | 64 |
| float* | mf_y_data | 4 | 4 |
| float* | mud_y_data | 4 | 4 |
| char* | mf_b_data | 4 | 4 |
| char* | mud_b_data | 4 | 4 |
| char* | mod_b_data | 4 | 4 |
| char | Code[Nchips * (1 + Nf)] | 1*38400*9 | 345600 |
| COMPLEX | mud_ylq_save[Na][Lmax] | 8*2*8 | 128 |
| int | Mrc_bit_idx_save | 4 | 4 |
| float | Repetition_rate | 4 | 4 |
| COMPLEX1,2 | mf_ylq[Na][Lmax][Nbits1 * (1 + Nf)] | 8*2*8*1200*9 | 1382400 |
| COMPLEX1,2 | mud_ylq[Na][Lmax][Nbits1 * (1 + Nf)] | 8*2*8*1200*9 | 1382400 |
| float1,2 | mf_y_data[Nbits1 * (1 + Nf)] | 4*1200*9 | 43200 |
| float1,2 | mud_y_data[Nbits1 * (1 + Nf)] | 4*1200*9 | 43200 |
| char(1,2) | mf_b_data[Nbits1 * (1 +Nf)] | 1*1200*9 | 10800 |
| char(1,2) | mud_b_data[Nbits1 * (1 + Nf)] | 1*1200*9 | 10800 |
| char(1,2) | mod_b_data[Nbits1 * (1 + Nf)] | 1*1200*9 | 10800 |
| Total | | | 3,383,304 |
| x256 v-users OLD: | | | 866 Mbytes |
| COMPLEX | Code[Nchips * 2] | 8*38400*2 | 614400 | where the following notations are defined:

1-Associated data, not explicitly part of structure
2-Based on 8 bits per symbol on average

| Lmax | = N_RAKE_FINGERS_MAX | =8 |
|---|---|---|
| Na | = N_ANTENNAS | =2 |
| Nslots | = N_SLOTS_PER_FRAME | =15 |
| (Nbitsmax 1 | = N_BITS_PER_FRAME_ MAX_1 | =9600) |
| Nchips | = N_CHIPS_PER_FRAME | =38400 |
| Nf | = N_FRAMES_RAKE_OUTPUT | =8 |
| Nbits1 | = MEAN_BITS_PER_FRAME_1 | =150*4.25 ~= 640. |

Each user class has a specified decoding to be performed. The decoding can be:

None
Soft Repetition Decoding (SRD)
Turbo decoding
Convolutional decoding.

All decoding is Soft-Input Soft-Output (SISO) decoding. For example, an SF 64 voice user produces 600 soft bits per frame. Thus 1,200 soft bits per 20 ms transmission time intervals (TTIs) are produced. These 1,200 soft bits are input to a SISO de-multiplex and convolution decoding function that output 1,200 soft bits. The SISO de-multiplex and convolution decoding function reduces the channel bit error rate (BER) and hence improve MUD performance. Since data is linear in memory to no reformatting of data is necessary and the operation can be performed in-place. If further decoders are included, reduced complexity partial-decode variants can be employed to reduce complexity. For turbo decoding, for example, the number of iterations may be limited to a small number.

The Long-code MUD performs the following operations:
Respread
Raised-Cosine Filtering
Despread
Maximal-Ratio Combining (MRC).

The re-spread function calculates r[t] given by $$\rho[t] \equiv \sum_{k=0}^{K_v-1} \sum_{p=0}^{L-1} \sum_{r} \delta[t - \hat{\tau}_{kp} - rN_c] \cdot \hat{a}_{kp}[r/2560] \cdot c_k[r] \cdot \hat{b}_k[r/N_k] \quad (20)$$

The function r[t] is calculated over the interval t=0: NF*M*Nc−1, where M=38400 is the number of chips per frame and Nf is the number of frames processed at a time. The actual function calculated is $$\rho_m[t] \equiv \rho[t+mN_cN_{chips}] \, t=0:\, N,\, N_{chips}-1 \quad (21)$$

which represents a section of the waveform of length Nchips chips, and the calculation is performed for m=0: Nf*M*Nc/Nchips −1. The function is defined (and allocated) for negative indices -(Lg−1): −1, representing the initial conditions which are set to zero at start-up. The parameter Lg is the length of the raised-cosine filter discussed below.

Note that every finger of every user adds one and only one non-zero contribution per chip within this interval corresponding to chip indices r. Given the delay lag tlq for the qth finger of the lth user we can determine which chip indices r contribute to a given interval. To this end define $$t=nN_c+q, \ 0 \leq q < N_c \ \hat{\tau}_{kp} \equiv n_{kp}N_c+q_{kp}, \ 0 \leq q_{kp} < N_c \quad (22)$$

The first definition defines t as belonging to the nth chip interval; the second is a decomposition of the delay lag into chip delay and sub-chip delay. Given the above we can solve for r and q using $$r=n-n_{kp} \ q=q_{kp} \quad (23)$$

Notice that chip indices r as given above can be negative. In the implementation the pointers $\hat{a}_{kp}$, $c_k$ and $\hat{b}_k$ point to the first element of frame 1 1006 (FIG. 10).

The repeated amplitude-code multiplies are avoided by using:

$$(\hat{a} \cdot c)_{kp}[s][c_k[r]] \equiv \hat{a}_{kp}[s] \cdot c_k[r]$$

$$(\hat{a} \cdot c)_{kp}[s][c] \equiv \begin{cases} \hat{a}_{kp}[s] \cdot (+1+j), & c = 0 \\ \hat{a}_{kp}[s] \cdot (-1+j), & c = 1 \\ \hat{a}_{kp}[s] \cdot (-1-j), & c = 2 \\ \hat{a}_{kp}[s] \cdot (+1-j), & c = 3 \end{cases} \quad (24)$$

$$c_k[r] \equiv \begin{cases} 0, & c_k[r] = +1+j \\ 1, & c_k[r] = -1+j \\ 2, & c_k[r] = -1-j \\ 3, & c_k[r] = +1-j \end{cases}$$

The raised-cosine filtering operation applied to the respread signal r[t] produces an estimate of the received signal given by:

$$\hat{r}[t] = \sum_{t'=0}^{L_g-1} g[t'] \cdot \rho[t-t'] \quad (25)$$

where g[t] is the raised-cosine pulse and

| | |
|---|---|
| t | = 0 : Nc*Nchips − 1 |
| t' | = 0 : Lg − 1 |
| Lg | = Nsamples-rc (length of raised-cosine filter) |

For example, if an impulse at t=0 is passed through the above filter the output is g[t]. The position of the maximum of the filter then specifies the delay through filter. The delay is relevant since it specifies the synchronization information necessary for subsequent despreading. The raised cosine filter is calculated over the time period n=(n1:n2)/Nc, where Nc is the number of samples per chip, and time is in chips. Note that n1 is negative, and the position of the maximum of the filter is at n=0. The length of the filter is then Lg=n2−n1, and the maximum occurs at sample n1. The delay is thus n1 samples, and the chip delay ns n1/Nc chips. For simplicity of implementation n1 is required to be a multiple of Nc.

The de-spread operation calculates the pre-MRC detection statistics corresponding to the estimate of the received signal:

$$y_{est,lq}^{(1)}[m] \equiv \frac{1}{2N_l} \sum_{n=0}^{N_t-1} \hat{r}[nN_c + \hat{\tau}_{lq} + mT_l] \cdot c_{lm}^*[n] \quad (26)$$

Prior to the MRC operation, the MUD pre-MRC detection statistics are calculated according to:

$$y_{lq}^{(1)}[m] = \hat{a}_{lq} \cdot \hat{b}_l[m] + y_{lq}^{(0)}[m] - y_{est,lq}^{(1)}[m] \quad (27)$$

These are then combined with antenna amplitudes to form the post-MRC detection statistics:

$$y_l^{(1)}[m] \equiv \text{Re}\left\{ \sum_{q=1}^{L} \hat{a}_{lq}^{(1)H} \cdot y_{lq}^{(1)}[m] \right\} \quad (28)$$

Figure 11:
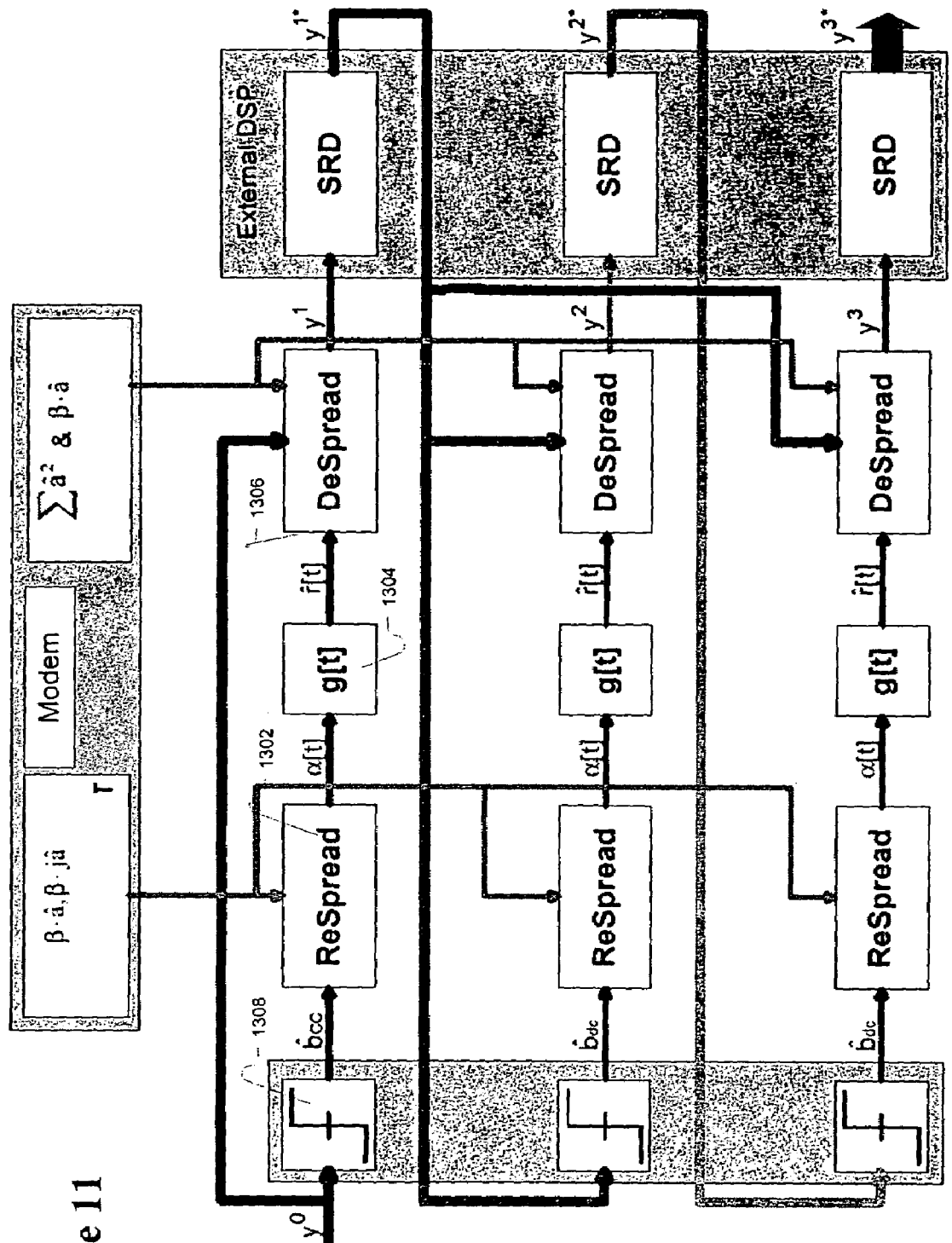
FIG. 11 depicts a long-code loading implementation utilizing pipelined processing and a triple-iteration of refinement in a system according to the invention.

Multiuser detection systems in accord with the foregoing embodiments can be implemented in any variety of general or special purpose hardware and/or software devices. FIG. 11 depicts one such implementation. In this embodiment, each frame of data is processed three times by the MUD processing card 118 (or, "MUD processor" for short), although it can be recognized that multiple such cards could be employed instead (or in addition) for this purpose. During the first pass, only the control channels are respread which the maximum ratio combination (MRC) and MUD processing is performed on the data channels. During subsequent passes, data channels are processed exclusively, with new y (i.e., soft decisions) and b (i.e., hard decisions) data being generated as shown in the diagram.

Amplitude ratios and amplitudes are determined via the DSP (e.g., element 900, or a DSP otherwise coupled with the processor board 118 and receiver 110), as well as certain waveform statistics. These values (e.g., matrices and vectors) are used by the MUD processor in various ways. The MUD processor is decomposed into four stages that closely match the structure of the software simulation: Alpha Calculation and Respread 1302, raised-cosine filtering 1304, de-spreading 1306, and MRC 1308. Each pass through the MUD processor is equivalent to one processing stage of the implementations discussed above. The design is pipelined and "parallelized." In the illustrated embodiment, the clock speed can be 132 MHz resulting in a throughput of 2.33 ms/frame, however, the clock rate and throughput varies depending on the requirements. The illustrated embodiment allows for three-pass MUD processing with additional overhead from external processing, resulting in a 4-times real-time processing throughput.

The alpha calculation and respread operations 1302 are carried out by a set of thirty-two processing elements arranged in parallel. These can be processing elements within an ASIC, FPGA, PLD or other such device, for example. Each processing element processes two users of four fingers each. Values for b are stored in a double-buffered lookup table. Values of â and jâ are pre-multiplied with beta by an external processor and stored in a quad-buffered lookup table. The alpha calculation state generated the following values for each finger, where subscripts indicate antenna identifier:

$$\alpha_0 = \beta_0 \cdot (C \cdot \hat{a}_0 - jC \cdot j\hat{a}_0)$$

$$j\alpha_0 = \beta_0 \cdot (jC \cdot \hat{a}_0 + C \cdot j\hat{a}_0)$$

$$\alpha_1 = \beta_1 \cdot ((C \cdot \hat{a}_1 - jC \cdot j\hat{a}_1)$$

$$j\alpha_1 = \beta_1 \cdot (jC \cdot \hat{a}_1 + C \cdot j\hat{a}_1)$$

These values are accumulated during the serial processing cycle into four independent 8-times oversampling buffers. There are eight memory elements in each buffer and the element used is determined by the sub-chip delay setting for each finger.

Once eight fingers have been accumulated into the oversampling buffer, the data is passed into set of four independent adder-tress. These adder-trees each termination in a single output, completing the respread operation. The four raised-cosine filters 1304 convolve the alpha data with a set of weights determined by the following equation:

$$g_{rc}(t) = \frac{\sin\left(\pi\frac{1}{t}\right)\cdot\cos\left(\alpha\pi\frac{1}{T}\right)}{\pi\frac{1}{t}\left(1-\left(2\alpha\frac{1}{T}\right)^2\right)}$$

The filters can be implemented with 97 taps with odd symmetry. The filters illustrated run at 8-times the chip rate, however, other rates are possible. The filters can be implemented in a variety of compute elements 220, or other devices such as ASICs, FPGAs for example.

The despread function 1306 can be performed by a set of thirty-two processing elements arranged in parallel. Each processing element serially processes two users of four fingers each. For each finger, one chip value out of eight, selected based on the sub-chip delay, is accepted from the output of the raised-cosine filter. The despread state performs the following calculations for each finger (subscripts indicate antenna):

$$y_0 = \sum_{0}^{SF-1} C \cdot r_0 + jC \cdot jr_0$$

$$jy_0 = \sum_{0}^{SF-1} C \cdot jr_0 + jC \cdot r_0$$

$$y_1 = \sum_{0}^{SF-1} C \cdot r_1 + jC \cdot jr_1$$

$$jy_1 = \sum_{0}^{SF-1} C \cdot jr_1 + jC \cdot r_1$$

the MCR operations are carried out by a set of four processing elements arranged in parallel, such as the compute elements 220 for example. Each processor is capable of serially processing eight users of four fingers each. Values for y are stored in a double-buffered lookup table. Values for b are derived from the MSB of the y data. Note that the b data used in the MUD stage is independent of the b data used in the respread stage. Values of $\hat{\alpha}$ and $j\hat{\alpha}$ are pre-multiplied with β by an external processor and stored in a quad-buffered lookup table. Also, $\Sigma(\hat{\alpha}^2+j\hat{\alpha}^2)$ for each channel is stored in a quad-buffered table.

The output stage contains a set of sequential destination buffer pointers for each channel. The data generated by each channel, on a slot basis, is transferred to the crossbar (or other interconnect) destination indicated by these buffers. The first word of each of these transfers will contain a counter in the lower sixteen bits indicating how many y values were generated. The upper sixteen bits will contain the constant value 0xAA55. This will allow the DSP to avoid interrupts by scanning the first word of each buffer. In addition, the DSP_UPDATE register contains a pointer to single crossbar location. Each time a slot or channel data is transmitted, an internal counter is written to this location. The counter is limited to 10 bits and will wrap around with a terminal count value of 1023.

The method of operation for the long-code multiple user detection algorithm (LCMUD) is as follows. Spread factor for four-channels requires significant amount of data transfer. In order to limit the gate count of the hardware implementation, processing an SF4 channel can result in reduced capability.

A SF4 user can be processed on certain hardware channels. When one of these special channels is operating on an SF4 user, the next three channels are disabled and are therefore unavailable for processing. This relationship is as shown in the following table:

| SF4 Chan | Disabled Channels | SF4 Chan | Disabled Channels |
|---|---|---|---|
| 0 | 1, 2, 3 | 32 | 33, 34, 35 |
| 4 | 5, 6, 7 | 36 | 37, 38, 39 |
| 8 | 9, 10, 11 | 40 | 41, 42, 43 |
| 12 | 12, 14, 15 | 44 | 45, 46, 47 |
| 16 | 17, 18, 19 | 48 | 49, 50, 51 |
| 20 | 21, 22, 23 | 52 | 53, 54, 55 |
| 24 | 25, 26, 27 | 56 | 57, 58, 59 |
| 28 | 29, 30, 31 | 60 | 61, 62, 63 |

The default y and b data buffers do not contain enough space for SF4 data. When a channel is operating on SF4 data, the y and b buffers extend into the space of the next channel in sequence. For example, if channel 0 is processing SF data, the channel 0 and channel 1 b buffers are merged into a single large buffer of 0×40 32-bit words. The y buffers are merged similarly.

In typical operation, the first pass of the LCMUD algorithm will respread the control channels in order to remove control interference. For this pass, the b data for the control channels should be loaded into BLUT while the y data for data channels should be loaded into YDEC. Each channel should be configured to operate at the spread factor of the data channel stored into the YDEC table.

Control channels are always operated at SF 256, so it is likely that the control data will need to be replicated to match the data channel spread factor. For example, each bit (b entry) of control data would be replicated 64 times if that control channel were associated with an SF 4 data channel.

Each finger in a channel arrives at the receiver with a different delay. During the Respread operation, this skew among the fingers is recreated. During the MRC stage of MUD processing, it is necessary to remove this skew and realign the fingers of each channel. This is accomplished in the MUD processor by determining the first bit available from the most delayed finger and discarding all previous bits from all other fingers. The number of bits to discard can be individually programmed for each finger with the Discard field of the MUDPARAM registers. This operation will typically result in a 'short' first slot of data. This is unavoidable when the MUD processor is first initialized and should not create any significant problems. The entire first slot of data can be completely discarded if 'short' slots are undesirable.

A similar situation will arise each time processing is begun on a frame of data. To avoid losing data, it is recommended that a partial slot of data from the previous frame be overlapped with the new frame. Trimming any redundant bits created this way can be accomplished with the Discard register setting or in the system DSP. In order to limit memory requirements, the LCMUD FPGA processes one slot of data at a time. Doubling buffering is used for b and y data so that processing can continue as data is streamed in. Filling these buffers is complicated by the skew that exists among fingers in a channel.

Figure 12:
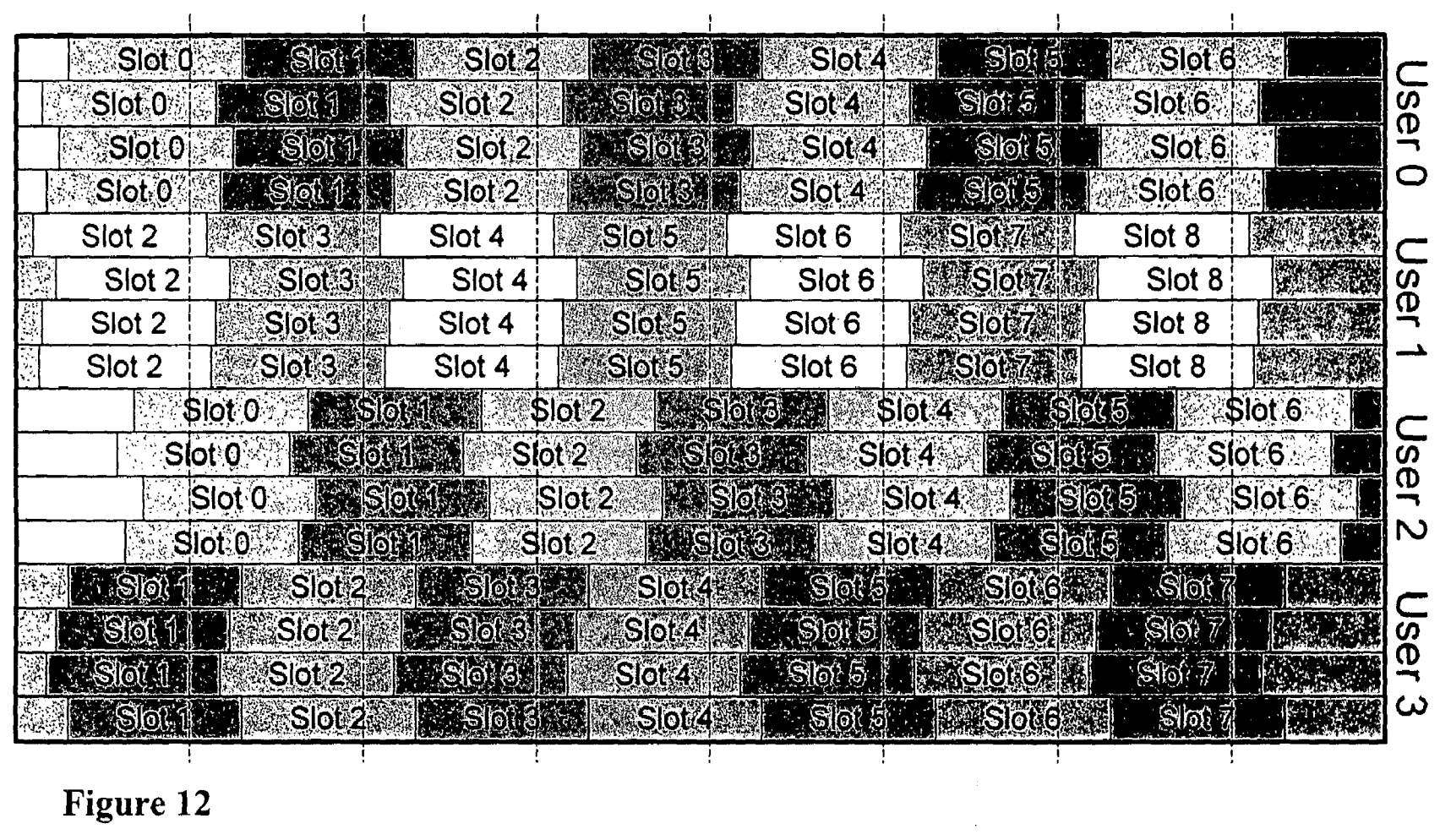

FIG. 12 illustrates the skew relationship among fingers in a channel and among the channels themselves. The illustrated embodiment allows for 20us (77.8 chips) of skew among fingers in a channel and certain skew among channels, however, in other embodiments these skew allowances vary.

There are three related problems that are introduced by skew: Identifying frame & slot boundaries, populating b and y tables and changing channel constants. Because every finger of every channel can arrive at a different time, there are no universal frame and slot boundaries. The DSP must select an arbitrary reference point. The data stored in b & y tables is likely to come from two adjacent slots.

Because skew exists among fingers in a channel, it is not enough to populate the b & y tables with 2,560 sequential chips of data. There must be come data overlap between buffers to allow lagging channels to access "old" data. The amount of overlap can be calculated dynamically or fixed at some number greater than 78 and divisible by four (e.g. 80chips). The starting point for each register is determined by the Chip Advance field of the MUDPARAM register.

A related problem is created by the significant skew among channels. As can be seen in FIG. 12. Channel 0 is receiving Slot 0 while Channel 1 is receiving Slot 2. The DSP must take this skew into account when generating the b and y tables and temporally align channel data.

Selecting an arbitrary "slot" of data from a channel implies that channel constants tied to the physical slot boundaries may change while processing the arbitrary slot. The Constant Advance field of the MUDPARAM register is used to indicate when these constants should change. Registers affected this way are quad-buffered. Before data processing begins, at least two of these buffers should be initialized. During normal operation, one additional buffer is initialized for each slot processed. This system guarantees that valid constants data will always be available.

The following two tables shown the long-code MUD FPGA memory map and control/status register:

The register YB indicates which of two y and b buffers are in use. If the system is currently not processing. YB indicates the buffer that will be used when processing is initiated.

CBUF indicates which of four round-robin buffers for MUD constants ($a\hat{}$ beta) is currently in use. Finger skew will result in some fingers using a buffer one in advance of this indicator. To guarantee that valid data is always available, two full buffers should be initialized before operation begins. If the system is currently not processing, CBUF indicates the buffer that will be used when processing is restarted. It is technically possible to indicate precisely which buffer is in use for each finger in both the Respread and Despread processing stages. However, this would require thirty-two 32-bit registers. Implementating these registers would be costly, and the information is of little value.

A1 and A0 indicate which y and b buffers are currently being processed. A1 and A0 will never indicate '1' at the same time. An indication of '0' for both A1 and A0 means that MUD processor is idle. R1 and R0 are writable fields that indicate to the MUD processor that data is available. R1 corresponds to y and b buffer 1 and R0 corresponds to y and b buffer 0. Writing a '1' into the correct register will initiate MUD processing. Note that these buffers follow strict round-robin ordering. The YB register indicates which buffer should be activated next.

These registers will be automatically reset to '0' by the MUD hardware once processing is completed. It is not possible for the external processor to force a '0' into these registers. A '1' in this bit indicates that this is the last slot of data in a frame. Once all available data for the slot has been processed, the output buffers will be flushed. A '1' in this bit will place the MUD processor into a reset state. The external processor must manually bring the MUD processor out of reset of writing a '0' into this bit.

DSP_UPDATE is arranged as two 32-bit registers. A RACEway™ route to the MUD DSP is stored at address 0x0000_0008. A pointer to a stats memory buffer is located at address 0x0000_000C. Each time the MUD processor writes a slot of channel data to a completion buffer, an incrementing count value is written to this address. The counter is fixed at 10 bits and will wrap around after a terminal count of 1023.

A quad-buffered version of the MUD parameter control register exists for each finger to be processed. Execution begins with buffer 0 and continues in round-robin fashion. These buffers are used in synchronization with the MUD constants (Beta * a_hat, etc.) buffers. Each finger is provided with an independent register to allow independent switching

| Start Addr | End Addr | Name | Description |
|---|---|---|---|
| 0000_0000 | 0000_0000 | CSR | Control & Status Register |
| 0000_0008 | 0000_000C | DSP_UPDATE | Route & Address for DSP updating |
| 0001_0000 | 0001_FFFF | MUDPARAM | MUD Parameters |
| 0002_0000 | 0002_FFFF | CODE | Spreading Codes |
| 0003_0000 | 0004_FFFF | BLUT | Respread: b Lookup Table |
| 0005_0000 | 0005_FFFF | BETA_A | Respread: Beta * a_hat Lookup Table |
| 0006_0000 | 0007_FFFF | YDEC | MUD & MRC: y Lookup Table |
| 0008_0000 | 0008_FFFF | ASQ | MUD & MRC: Sum a_hat squared LUT |
| 000A_0000 | 000A_FFFF | OUTPUT | Output Routes & Addresses |

| Bit | 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|---|
| Name | | | | | | | | Reserved | | | | | | | | |
| R/W | | | | | | | | RO | | | | | | | | |
| Reset | X | X | X | X | X | X | X | X | X | X | X | X | X | X | X | X |

| Bit | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| Name | | | Reserved | | | | | YB | CBUF | | A1 | A0 | R1 | R0 | Lst | Rst |
| R/W | | | RO | | | | | RO | RO | | RO | RO | Rw | Rw | Rw | Rw |
| Reset | X | X | X | X | X | X | X | 0 | 0 | | 0 | 0 | 0 | 0 | 0 | 0 | of constant values at slot and frame boundaries. The following table shows offsets for each MUD channel:

| Offset | User | Offset | User | Offset | User | Offset | User |
|---|---|---|---|---|---|---|---|
| 0x0000 | 0 | 0x0400 | 16 | 0x0800 | 32 | 0x0C00 | 48 |
| 0x0040 | 1 | 0x0440 | 17 | 0x0840 | 33 | 0x0C40 | 49 |
| 0x0080 | 2 | 0x0480 | 18 | 0x0880 | 34 | 0x0C80 | 50 |
| 0x00C0 | 3 | 0x04C0 | 19 | 0x08C0 | 35 | 0x0CC0 | 51 |
| 0x0100 | 4 | 0x0500 | 20 | 0x0900 | 36 | 0x0D00 | 52 |
| 0x0140 | 5 | 0x0540 | 21 | 0x0940 | 37 | 0x0D40 | 53 |
| 0x0180 | 6 | 0x0580 | 22 | 0x0980 | 38 | 0x0D80 | 54 |
| 0x01C0 | 7 | 0x05C0 | 23 | 0x09C0 | 39 | 0x0DC0 | 55 |
| 0x0200 | 8 | 0x0600 | 24 | 0x0A00 | 40 | 0x0E00 | 56 |
| 0x0240 | 9 | 0x0640 | 25 | 0x0A40 | 41 | 0x0E40 | 57 |
| 0x0280 | 10 | 0x0680 | 26 | 0x0A80 | 42 | 0x0E80 | 58 |
| 0x02C0 | 11 | 0x06C0 | 27 | 0x0AC0 | 43 | 0x0EC0 | 59 |
| 0x0300 | 12 | 0x0700 | 28 | 0x0B00 | 44 | 0x0F00 | 60 |
| 0x0340 | 13 | 0x0740 | 29 | 0x0B40 | 45 | 0x0F40 | 61 |
| 0x0380 | 14 | 0x0780 | 30 | 0x0B80 | 46 | 0x0F80 | 62 |
| 0x03C0 | 15 | 0x07C0 | 31 | 0x0BC0 | 47 | 0x0FC0 | 63 |

The following table shows buffer offsets within each channel:

| Offset | Finger | Buffer |
|---|---|---|
| 0x0000 | 0 | 0 |
| 0x0004 |   | 1 |
| 0x0008 |   | 2 |
| 0x000C |   | 3 |
| 0x0010 | 1 | 0 |
| 0x0014 |   | 1 |
| 0x0018 |   | 2 |
| 0x001C |   | 3 |
| 0x0020 | 2 | 0 |
| 0x0024 |   | 1 |
| 0x0028 |   | 2 |
| 0x002C |   | 3 |
| 0x0030 | 3 | 0 |
| 0x0034 |   | 1 |
| 0x0038 |   | 2 |
| 0x003C |   | 3 |

The following table shown details of the control register:

| Bit | 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|---|
| Name | Spread Factor | | | | Subchip Delay | | | | Discard | | | | | | | |
| R/W | RW | | | | RW | | | | RW | | | | | | | |
| Reset | X | X | X | X | X | X | X | X | X | X | X | X | X | X | X | X |

| Bit | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| Name | Chip Advance | | | | | | | | Constant Advance | | | | | | | |
| R/W | RW | | | | | | | | RW | | | | | | | |
| Reset | X | X | X | X | X | X | X | X | X | X | X | X | X | X | X | X |

The spread factor field determines how many chip samples are used to generate a data bit. In the illustrated embodiment, all fingers in a channel have the same spread factor setting, however, it can be appreciated by one skilled in the art that such constant factor setting can be variable in other embodiments. The spread factor is encoded in a 3-bit value as shown in the following table:

| SF Factor | Spread Factor |
|---|---|
| 000 | 256 |
| 001 | 128 |
| 010 | 64 |
| 011 | 32 |
| 100 | 16 |
| 101 | 8 |
| 110 | 4 |
| 111 | RESERVED |

The field specifies the sub-chip delay for the finger. It is used to select one of eight accumulation buffers prior to summing all Alpha values and passing them into the raised-cosine filter. Discard determines how many MUD-processed soft decisions (y values) to discard at the start of processing. This is done so that the first y value from each finger corresponds to the same bit. After the first slot of data is processed, the Discard field should be set to zero.

The behavior of the discard field is different than that of other register fields. Once a non-zero discard setting is detected, any new discard settings from switching to a new table entry are ignored until the current discard count reaches zero. After the count reaches zero, a new discard setting may be loaded the next time a new table entry is accessed.

All fingers within a channel will arrive at the receiver with different delays. Chip Advance is used to recreate this signal skew during the Respread operation. Y and b buffers are arranged with older data occupying lower memory addresses. Therefore, the finger with the earliest arrival time has the highest value of chip advance. Chip Advanced need not be a multiple of Spread Factor.

Constant advance indicates on which chip this finger should switch to a new set of constants (e.g., a^) and a new control register setting. Note that the new values take effect on the chip after the value stored here. For example, a value of 0x0 would cause the new constants to take effect on chip 1. A value of 0xFF would cause the new constants to take effect on chip 0 of the next slot. The b lookup tables are arranged as shown in the following table. B values each occupy two bits of memory, although only the LSB is utilized by LCMUD hardware.

| Offset | Buffer |
|---|---|
| 0x0000 | U0 B0 |
| 0x0020 | U1 B0 |
| 0x0040 | U0 B1 |
| 0x0060 | U1 B1 |
| 0x0080 | U2 B0 |
| 0x00A0 | U3 B0 |
| 0x00C0 | U2 B1 |
| 0x00E0 | U3 B1 |
| 0x0100 | U4 B0 |
| 0x0120 | U5 B0 |
| 0x0140 | U4 B1 |
| 0x0160 | U5 B1 |
| 0x0180 | U6 B0 |
| 0x01A0 | U7 B0 |
| 0x01C0 | U6 B1 |
| 0x01E0 | U7 B1 |
| 0x0200 | U8 B0 |
| 0x0220 | U9 B0 |
| 0x0240 | U8 B1 |
| 0x0260 | U9 B1 |
| 0x0280 | U10 B0 |
| 0x02A0 | U11 B0 |
| 0x02C0 | U10 B1 |
| 0x02E0 | U11 B1 |
| 0x0300 | U12 B0 |
| 0x0320 | U13 B0 |
| 0x0340 | U12 B1 |
| 0x0360 | U13 B1 |
| 0x0380 | U14 B0 |
| 0x03A0 | U15 B0 |
| 0x03C0 | U14 B1 |
| 0x03E0 | U15 B1 |
| 0x0400 | U16 B0 |
| 0x0420 | U17 B0 |
| 0x0440 | U16 B1 |
| 0x0460 | U17 B1 |
| 0x0480 | U18 B0 |
| 0x04A0 | U19 B0 |
| 0x04C0 | U18 B1 |
| 0x04E0 | U19 B1 |
| 0x0500 | U20 B0 |
| 0x0520 | U21 B0 |
| 0x0540 | U20 B1 |
| 0x0560 | U21 B1 |
| 0x0580 | U22 B0 |
| 0x05A0 | U23 B0 |
| 0x05C0 | U22 B1 |
| 0x05E0 | U23 B1 |
| 0x0600 | U24 B0 |
| 0x0620 | U25 B0 |
| 0x0640 | U24 B1 |
| 0x0660 | U25 B1 |
| 0x0680 | U26 B0 |
| 0x06A0 | U27 B0 |
| 0x06C0 | U26 B1 |
| 0x06E0 | U27 B1 |
| 0x0700 | U28 B0 |
| 0x0720 | U29 B0 |
| 0x0740 | U28 B1 |
| 0x0760 | U29 B1 |
| 0x0780 | U30 B0 |
| 0x07A0 | U31 B0 |
| 0x07C0 | U30 B1 |
| 0x07E0 | U31 B1 |
| 0x0800 | U32 B0 |
| 0x0820 | U33 B0 |
| 0x0840 | U32 B1 |
| 0x0860 | U33 B1 |
| 0x0880 | U34 B0 |
| 0x08A0 | U35 B0 |
| 0x08C0 | U34 B1 |
| 0x08E0 | U35 B1 |
| 0x0900 | U36 B0 |
| 0x0920 | U37 B0 |
| 0x0940 | U36 B1 |
| 0x0960 | U37 B1 |
| 0x0980 | U38 B0 |
| 0x09A0 | U39 B0 |
| 0x09C0 | U38 B1 |
| 0x09E0 | U39 B1 |
| 0x0A00 | U40 B0 |
| 0x0A20 | U41 B0 |
| 0x0A40 | U40 B1 |
| 0x0A60 | U41 B1 |
| 0x0A80 | U42 B0 |
| 0x0AA0 | U43 B0 |
| 0x0AC0 | U42 B1 |
| 0x0AE0 | U43 B1 |
| 0x0B00 | U44 B0 |
| 0x0B20 | U45 B0 |
| 0x0B40 | U44 B1 |
| 0x0B60 | U45 B1 |
| 0x0B80 | U46 B0 |
| 0x0BA0 | U47 B0 |
| 0x0BC0 | U46 B1 |
| 0x0BE0 | U47 B1 |
| 0x0C00 | U48 B0 |
| 0x0C20 | U49 B0 |
| 0x0C40 | U48 B1 |
| 0x0C60 | U49 B1 |
| 0x0C80 | U50 B0 |
| 0x0CA0 | U51 B0 |
| 0x0CC0 | U50 B1 |
| 0x0CE0 | U51 B1 |
| 0x0D00 | U52 B0 |
| 0x0D20 | U53 B0 |
| 0x0D40 | U52 B1 |
| 0x0D60 | U53 B1 |
| 0x0D80 | U54 B0 |
| 0x0DA0 | U55 B0 |
| 0x0DC0 | U54 B1 |
| 0x0DE0 | U55 B1 |
| 0x0E00 | U56 B0 |
| 0x0E20 | U57 B0 |
| 0x0E40 | U56 B1 |
| 0x0E60 | U57 B1 |
| 0x0E80 | U58 B0 |
| 0x0EA0 | U59 B0 |
| 0x0EC0 | U58 B1 |
| 0x0EE0 | U59 B1 |
| 0x0F00 | U60 B0 |
| 0x0F20 | U61 B0 |
| 0x0F40 | U60 B1 |
| 0x0F60 | U61 B1 |
| 0x0F80 | U62 B0 |
| 0x0FA0 | U63 B0 |
| 0x0FC0 | U62 B1 |
| 0x0FE0 | U63 B1 |

The following table illustrates how the two-bit values are packed into 32-bit words. Spread Factor 4 channels require more storage space than is available in a single channel buffer. To allow for SF4 processing, the buffers for an even channel and the next highest odd channel are joined together. The even channel performs the processing while the odd channel is disabled.

| Bit  | 31   | 30 | 29   | 28 | 27    | 26 | 25    | 24 | 23    | 22 | 21    | 20 | 19    | 18 | 17    | 16 |
|------|------|----|------|----|-------|----|-------|----|-------|----|-------|----|-------|----|-------|----|
| Name | b(0) |    | b(1) |    | b(2)  |    | b(3)  |    | b(4)  |    | b(5)  |    | b(6)  |    | b(7)  |    |
| Bit  | 15   | 14 | 13   | 12 | 11    | 10 | 9     | 8  | 7     | 6  | 5     | 4  | 3     | 2  | 1     | 0  |
| Name | b(8) |    | b(9) |    | b(10) |    | b(11) |    | b(12) |    | b(13) |    | b(14) |    | b(15) |    |

The beta*a-hat table contains the amplitude estimates for each finger pre-multiplied by the value of Beta. The following table shows the memory mappings for each channel.

| Offset | User | Offset | User | Offset | User | Offset | User |
|--------|------|--------|------|--------|------|--------|------|
| 0x0000 | 0    | 0x0800 | 16   | 0x1000 | 32   | 0x1800 | 48   |
| 0x0080 | 1    | 0x0880 | 17   | 0x1080 | 33   | 0x1880 | 49   |
| 0x0100 | 2    | 0x0900 | 18   | 0x1100 | 34   | 0x1900 | 50   |
| 0x0180 | 3    | 0x0980 | 19   | 0x1180 | 35   | 0x1980 | 51   |
| 0x0200 | 4    | 0x0A00 | 20   | 0x1200 | 36   | 0x1A00 | 52   |
| 0x0280 | 5    | 0x0A80 | 21   | 0x1280 | 37   | 0x1A80 | 53   |
| 0x0300 | 6    | 0x0B00 | 22   | 0x1300 | 38   | 0x1B00 | 54   |
| 0x0380 | 7    | 0x0B80 | 23   | 0x1380 | 39   | 0x1B80 | 55   |
| 0x0400 | 8    | 0x0C00 | 24   | 0x1400 | 40   | 0x1C00 | 56   |
| 0x0480 | 9    | 0x0C80 | 25   | 0x1480 | 41   | 0x1C80 | 57   |
| 0x0500 | 10   | 0x0D00 | 26   | 0x1500 | 42   | 0x1D00 | 58   |
| 0x0580 | 11   | 0x0D80 | 27   | 0x1580 | 43   | 0x1D80 | 59   |
| 0x0600 | 12   | 0x0E00 | 28   | 0x1600 | 44   | 0x1E00 | 60   |
| 0x0680 | 13   | 0x0E80 | 29   | 0x1680 | 45   | 0x1E80 | 61   |
| 0x0700 | 14   | 0x0F00 | 30   | 0x1700 | 46   | 0x1F00 | 62   |
| 0x0780 | 15   | 0x0F80 | 31   | 0x1780 | 47   | 0x1F80 | 63   |

The following table shows buffers that are distributed for each channel:

| Offset | User Buffer |
|--------|-------------|
| 0x00   | 0           |
| 0x20   | 1           |
| 0x40   | 2           |
| 0x80   | 3           |

The following table shows a memory mapping for individual fingers of each antenna.

| Offset | Finger | Antenna |
|--------|--------|---------|
| 0x00   | 0      | 0       |
| 0x04   | 1      |         |
| 0x08   | 2      |         |
| 0x0C   | 3      |         |
| 0x10   | 0      | 1       |
| 0x14   | 1      |         |
| 0x18   | 2      |         |
| 0x1C   | 3      |         |

The y (soft decisions) table contains two buffers for each channel. Like the b lookup table, an even and odd channel are bonded together to process SF4. Each y data value is stored as a byte. The data is written into the buffers as packed 32-bit words.

| Offset | Buffer |
|--------|--------|
| 0x0000 | U0 B0  |
| 0x0200 | U1 B0  |
| 0x0400 | U2 B1  |
| 0x0600 | U3 B1  |
| 0x0800 | U0 B0  |
| 0x0A00 | U1 B0  |
| 0x0C00 | U2 B1  |
| 0x0E00 | U3 B1  |
| 0x0000 | U4 B0  |
| 0x0200 | U5 B0  |
| 0x0400 | U6 B1  |
| 0x0600 | U7 B1  |
| 0x0800 | U4 B0  |
| 0x0A00 | U5 B0  |
| 0x0C00 | U6 B1  |
| 0x0E00 | U7 B1  |
| 0x0000 | U8 B0  |
| 0x0200 | U9 B0  |
| 0x0400 | U10 B1 |
| 0x0600 | U11 B1 |
| 0x0800 | U8 B0  |
| 0x0A00 | U9 B0  |
| 0x0C00 | U10 B1 |
| 0x0E00 | U11 B1 |
| 0x0000 | U12 B0 |
| 0x0200 | U13 B0 |
| 0x0400 | U14 B1 |
| 0x0600 | U15 B1 |
| 0x0800 | U12 B0 |
| 0x0A00 | U13 B0 |
| 0x0C00 | U14 B1 |
| 0x0E00 | U15 B1 |
| 0x4000 | U16 B0 |
| 0x4200 | U17 B0 |
| 0x4400 | U18 B1 |
| 0x4600 | U19 B1 |
| 0x4800 | U16 B0 |
| 0x4A00 | U17 B0 |
| 0x4C00 | U18 B1 |
| 0x4E00 | U19 B1 |
| 0x5000 | U20 B0 |
| 0x5200 | U21 B0 |
| 0x5400 | U22 B1 |
| 0x5600 | U23 B1 |
| 0x5800 | U20 B0 |
| 0x5A00 | U21 B0 |
| 0x5C00 | U22 B1 |
| 0x5E00 | U23 B1 |
| 0x6000 | U24 B0 |
| 0x6200 | U25 B0 |
| 0x6400 | U26 B1 |
| 0x6600 | U27 B1 |
| 0x6800 | U24 B0 |
| 0x6A00 | U25 B0 |
| 0x6C00 | U26 B1 |
| 0x6E00 | U27 B1 |
| 0x7000 | U28 B0 |
| 0x7200 | U29 B0 |
| 0x7400 | U30 B1 |
| 0x7600 | U31 B1 |
| 0x7800 | U28 B0 |
| 0x7A00 | U29 B0 |
| 0x7C00 | U30 B1 |

-continued

| Offset | Buffer |
|---|---|
| 0x7E00 | U31 B1 |
| 0x8000 | U32 B0 |
| 0x8200 | U33 B0 |
| 0x8400 | U34 B1 |
| 0x8600 | U35 B1 |
| 0x8800 | U32 B0 |
| 0x8A00 | U33 B0 |
| 0x8C00 | U34 B1 |
| 0x8E00 | U35 B1 |
| 0x9000 | U36 B0 |
| 0x9200 | U37 B0 |
| 0x9400 | U38 B1 |
| 0x9600 | U39 B1 |
| 0x9800 | U36 B0 |
| 0x9A00 | U37 B0 |
| 0x9C00 | U38 B1 |
| 0x9E00 | U39 B1 |
| 0xA000 | U40 B0 |
| 0xA200 | U41 B0 |
| 0xA400 | U42 B1 |
| 0xA600 | U43 B1 |
| 0xA800 | U40 B0 |
| 0xAA00 | U41 B0 |
| 0xAC00 | U42 B1 |
| 0xAE00 | U43 B1 |
| 0xB000 | U44 B0 |
| 0xB200 | U45 B0 |
| 0xB400 | U46 B1 |
| 0xB600 | U47 B1 |
| 0xB800 | U44 B0 |
| 0xBA00 | U45 B0 |
| 0xBC00 | U46 B1 |
| 0xBE00 | U47 B1 |
| 0xC000 | U48 B0 |
| 0xC200 | U49 B0 |
| 0xC400 | U50 B1 |
| 0xC600 | U51 B1 |
| 0xC800 | U48 B0 |
| 0xCA00 | U49 B0 |
| 0xCC00 | U50 B1 |
| 0xCE00 | U51 B1 |
| 0xD000 | U52 B0 |
| 0xD200 | U53 B0 |
| 0xD400 | U54 B1 |
| 0xD600 | U55 B1 |
| 0xD800 | U52 B0 |
| 0xDA00 | U53 B0 |
| 0xDC00 | U54 B1 |
| 0xDE00 | U55 B1 |
| 0xE000 | U56 B0 |
| 0xE200 | U57 B0 |
| 0xE400 | U58 B1 |
| 0xE600 | U59 B1 |
| 0xE800 | U56 B0 |
| 0xEA00 | U57 B0 |
| 0xEC00 | U58 B1 |
| 0xEE00 | U59 B1 |
| 0xF000 | U60 B0 |
| 0xF200 | U61 B0 |
| 0xF400 | U62 B1 |
| 0xF600 | U63 B1 |
| 0xF800 | U60 B0 |
| 0xFA00 | U61 B0 |
| 0xFC00 | U62 B1 |
| 0xFE00 | U63 B1 |

The sum of the a-hat squares is stored as a 16-bit value. The following table contains a memory address mapping for each channel.

| Offset | User | Offset | User | Offset | User | Offset | User |
|---|---|---|---|---|---|---|---|
| 0x0000 | 0 | 0x0200 | 16 | 0x0400 | 32 | 0x0600 | 48 |
| 0x0020 | 1 | 0x0220 | 17 | 0x0420 | 33 | 0x0620 | 49 |
| 0x0040 | 2 | 0x0240 | 18 | 0x0440 | 34 | 0x0640 | 50 |
| 0x0060 | 3 | 0x0260 | 19 | 0x0460 | 35 | 0x0660 | 51 |
| 0x0080 | 4 | 0x0280 | 20 | 0x0480 | 36 | 0x0680 | 52 |
| 0x00A0 | 5 | 0x02A0 | 21 | 0x04A0 | 37 | 0x06A0 | 53 |
| 0x00C0 | 6 | 0x02C0 | 22 | 0x04C0 | 38 | 0x06C0 | 54 |
| 0x00E0 | 7 | 0x02E0 | 23 | 0x04E0 | 39 | 0x06E0 | 55 |
| 0x0100 | 8 | 0x0300 | 24 | 0x0500 | 40 | 0x0700 | 56 |
| 0x0120 | 9 | 0x0320 | 25 | 0x0520 | 41 | 0x0720 | 57 |
| 0x0140 | 10 | 0x0340 | 26 | 0x0540 | 42 | 0x0740 | 58 |
| 0x0160 | 11 | 0x0360 | 27 | 0x0560 | 43 | 0x0760 | 59 |
| 0x0180 | 12 | 0x0380 | 28 | 0x0580 | 44 | 0x0780 | 60 |
| 0x01A0 | 13 | 0x03A0 | 29 | 0x05A0 | 45 | 0x07A0 | 61 |
| 0x01C0 | 14 | 0x03C0 | 30 | 0x05C0 | 46 | 0x07C0 | 62 |
| 0x01E0 | 15 | 0x03E0 | 31 | 0x05E0 | 47 | 0x07E0 | 63 |

Within each buffer, the value for antenna 0 is stored at address offset 0x0 with the value for antenna one stored at address offset 0x04. The following table demonstrates a mapping for each finger.

| Offset | User Buffer |
|---|---|
| 0x00 | 0 |
| 0x08 | 1 |
| 0x10 | 2 |
| 0x1C | 3 |

Each channel is provided a crossbar (e.g., RACEway™) route on the bus, and a base address for buffering output on a slot basis. Registers for controlling buffers are allocated as shown in the following table tables. External devices are blocked from writing to register addresses marked as reserved.

| Offset | User | Offset | User | Offset | User | Offset | User |
|---|---|---|---|---|---|---|---|
| 0x0000 | 0 | 0x0200 | 16 | 0x0400 | 32 | 0x0600 | 48 |
| 0x0020 | 1 | 0x0220 | 17 | 0x0420 | 33 | 0x0620 | 49 |
| 0x0040 | 2 | 0x0240 | 18 | 0x0440 | 34 | 0x0640 | 50 |
| 0x0060 | 3 | 0x0260 | 19 | 0x0460 | 35 | 0x0660 | 51 |
| 0x0080 | 4 | 0x0280 | 20 | 0x0480 | 36 | 0x0680 | 52 |
| 0x00A0 | 5 | 0x02A0 | 21 | 0x04A0 | 37 | 0x06A0 | 53 |
| 0x00C0 | 6 | 0x02C0 | 22 | 0x04C0 | 38 | 0x06C0 | 54 |
| 0x00E0 | 7 | 0x02E0 | 23 | 0x04E0 | 39 | 0x06E0 | 55 |
| 0x0100 | 8 | 0x0300 | 24 | 0x0500 | 40 | 0x0700 | 56 |
| 0x0120 | 9 | 0x0320 | 25 | 0x0520 | 41 | 0x0720 | 57 |
| 0x0140 | 10 | 0x0340 | 26 | 0x0540 | 42 | 0x0740 | 58 |
| 0x0160 | 11 | 0x0360 | 27 | 0x0560 | 43 | 0x0760 | 59 |
| 0x0180 | 12 | 0x0380 | 28 | 0x0580 | 44 | 0x0780 | 60 |
| 0x01A0 | 13 | 0x03A0 | 29 | 0x05A0 | 45 | 0x07A0 | 61 |
| 0x01C0 | 14 | 0x03C0 | 30 | 0x05C0 | 46 | 0x07C0 | 62 |
| 0x01E0 | 15 | 0x03E0 | 31 | 0x05E0 | 47 | 0x07E0 | 63 |

| Offset | Entry |
|---|---|
| 0x0000 | Route to Channel Destination |
| 0x0004 | Base Address for Buffers |
| 0x0008 | Buffers |
| 0x000C | RESERVED |
| 0x0010 | RESERVED |
| 0x0014 | RESERVED |
| 0x0018 | RESERVED |
| 0x001C | RESERVED |

Slot buffer size is automatically determined by the channel spread factor. Buffers are used in round-robin fashion and all buffers for a channel must be arranged contiguously. The buffers control register determines how many buffers are allocated for each channel. A setting of 0 indicates one available buffer, a setting of 1 indicates two available buffers, and so on.

A further understanding of the operation of the illustrated and other embodiments of the invention may be attained by reference to (i) U.S. Provisional Application Ser. No. 60/275,846 filed Mar. 14, 2001, entitled "Improved Wireless Communications Systems and Methods"; (ii) U.S. Provisional Application Ser. No. 60/289,600 filed May 7, 2001, entitled "Improved Wireless Communications Systems and Methods Using Long-Code Multi-User Detection" and (iii) U.S. Provisional Application Ser. No. 60/295,060 filed Jun. 1, 2001 entitled "Improved Wireless Communications Systems and Methods for a Communications Computer," the teachings all of which are incorporated herein by reference, and a copy of the latter of which may be filed herewith.

The above embodiments are presented for illustrative purposes only. Those skilled in the art will appreciate that various modifications can be made to these embodiments without departing from the scope of the present invention. For example, multiple summations can be utilized by a system of the invention, and not separate summations as described herein. Moreover, by way of further non-limiting example, it will be appreciated that although the terminology used above is largely based on the UMTS CDMA protocols, that the methods and apparatus described herein are equally applicable to DS/CMDA, CDMA2000 1X, CDMA2000 1xEV-DO, and other forms of CDMA.

Therefore, in view of the foregoing, what I claim is:

1. A spread spectrum communication system of the type that processes one or more spread-spectrum waveforms ("user spread-spectrum waveforms"), each representative of a waveform associated with a respective user, comprising:
   a first logic element that generates a residual composite spread-spectrum waveform as a function of an arithmetic difference between a composite spread-spectrum waveform and an estimated composite spread-spectrum waveform,
   one or more second logic elements each coupled to the first logic element, each second logic element generating a refined matched-filter detection statistic for at least a selected user as a function of
   (i) the residual composite spread-spectrum waveform and
   (ii) a characteristic of an estimate of the selected user's spread-spectrum waveform
wherein each second logic element comprises rake logic and summation logic which generates the refined matched-filter detection statistics based on the relation $$y_k^{(n+1)}[m] = A_k^{(n)^2} \cdot \hat{b}_k^{(n)}[m] + y_{res,k}^{(n)}[m]$$

wherein
   $A_k^{(n)^2}$ represents an amplitude statistic,
   $\hat{b}_k^{(n)}[m]$ represents a soft symbol estimate for the $k^{th}$ user for the $m^{th}$ symbol period,
   $y_{res,k}^{(n)}[m]$ represents a residual matched-filter detection statistic for the $A^{th}$ user, and
   n is an iteration count.

2. The system of claim 1, wherein the characteristic is at least one of an estimated amplitude and an estimated symbol associated with the estimate of the selected user's spread-spectrum waveform.

3. The system of claim 1, wherein the spread-spectrum communications system comprises a code division multiple access (CDMA) base station.

4. The system of claim 1, wherein the CDMA base station comprises one or more long-code receivers, and each long-code receiver generating one or more respective matched-filter detection statistics, from which the estimated composite spread-spectrum waveform is, in part, generated.

5. The system of claim 1, wherein the first logic element comprises summation logic which generates the residual composite spread-spectrum waveform based on the relation $$r_{res}^{(n)}[t] \equiv r[t] - \hat{r}^{(n)}[t],$$

wherein
   $r_{res}^{(n)}[t]$ is the residual composite spread-spectrum waveform,
   r[t] represents the composite spread-spectrum waveform,
   $\hat{r}^{(n)}[t]$ represents the estimated composite spread-spectrum waveform,
   t is a sample time period, and
   n is an iteration count.

6. The system of claim 5, wherein the estimated composite spread-spectrum waveform is pulse-shaped and is based on estimated complex amplitudes, estimated delay lags, estimated symbols, and codes of the one or more user spread-spectrum waveforms.

7. The system of claim 1, wherein the refined matched-filter detection statistic for each user is iteratively generated.

8. The system of claim 1, wherein the refined matched-filter detection statistic for at least a selected user is generated by a long-code receiver.

9. The system of claim 1, wherein the first and second logic elements are implemented on any of processors, field programmable gate arrays, array processors and co-processors, or any combination thereof.

10. A spread spectrum communication system of the type that processes one or more user spread-spectrum waveforms, each representative of a waveform associated with a respective user, comprising:
   a first logic element which generates an estimated composite spread-spectrum waveform that is a function of estimated user complex channel amplitudes, time lags, and user codes,
   a second logic element coupled to the first logic element, the second logic element generating a residual composite spread-spectrum waveform as a function of an arithmetic difference between a composite user spread-spectrum waveform and the estimated composite spread-spectrum waveform,
   one or more third logic elements each coupled to the second logic element, the third logic element generating a refined matched filer detection statistic for at least a selected user as a function of
   (i) the residual composite spread-spectrum waveform and
   (ii) a characteristic of an estimate of the selected user's spread-spectrum waveform
wherein the first logic element further comprises arithmetic logic which generates the estimated composite spread-spectrum waveform based on the relation $$\hat{r}^{(n)}[t] = \sum_r g[r]\rho^{(n)}[t-r],$$

wherein
   $\hat{r}^{(n)}[t]$ represents the estimated composite spread-spectrum waveform, p$^{(n)}$[t-r] represents an estimated composite re-spaced waveform, g[r] represents a raised-cosine pulse shape.

11. The system of claim 10, wherein the characteristic is at least one of an estimated amplitude, an estimated delay lag and an estimated symbol associated with the estimate of the selected user's spread-spectrum waveform.

12. The system of claim 10, wherein the spread-spectrum communications system is a code division multiple access (CDMA) base station.

13. The system of claim 12, wherein the CDMA base station comprises long-code receivers.

14. The system of claim 10, wherein the first logic element comprises arithmetic logic which generates an estimated composite re-spread waveform based on the relation $$\rho^{(n)}[t] = \sum_{k=1}^{K_v} \sum_{p=1}^{L} \sum_{r} \delta[t - \hat{\tau}_{kp}^{(n)} - rN_c] \cdot \hat{a}_{kp}^{(n)} \cdot c_k[r] \cdot \hat{b}_k^{(n)}[\lfloor r/N_k \rfloor],$$

wherein $K_v$ is a number of simultaneous dedicated physical channels for all users, $\delta[t]$ is a discrete-time delta function, $\hat{\alpha}_{kp}^{(n)}$ is an estimated complex channel amplitude for the p$^{th}$ multipath component for the k$^{th}$ user, $c_k[r]$ represents a user code comprising at least a scrambling code, an orthogonal variable spreading factor code, and a j factor associated with even numbered dedicated physical channels, $\hat{b}_k^{(n)}[m]$ represents a soft symbol estimate for the k$^{th}$ user for the m$^{th}$ symbol period, $\hat{\tau}_{kp}^{(n)}$ is an estimated time lag for the p$^{th}$th multipath component for the k$^{th}$ user, $N_k$ is a spreading factor for the k$^{th}$ user, t is a sample time index, L is a number of multi-path components, $N_o$ is a number of samples per chip, and n is an iteration count.

15. The system of claim 10, wherein the second logic element comprises summation logic which generates the residual composite spread-spectrum waveform that based on the relation $r_{res}^{(n)}[t] \equiv r[t] - \hat{r}^{(n)}[t],$ wherein $r_{res}^{(n)}[t]$ is the residual composite spread-spectrum waveform, r[t] represents the composite spread-spectrum waveform, $\hat{r}^{(n)}[t]$ represents the estimated composite spread-spectrum waveform, t is a sample time period, and n is an iteration count.

16. The system of claim 15, wherein the estimated composite spread-spectrum waveform is pulse-shaped and is based on the user spread-spectrum waveform.

17. A spread spectrum communication system of the type that processes one or more user spread-spectrum waveforms, each representative of a waveform associated with a respective user, comprising:

a first logic element which generates an estimated composite spread-spectrum waveform that is a function of estimated user complex channel amplitudes, time lags, and user codes, a second logic element coupled to the first logic element, the second logic element generating a residual composite spread-spectrum waveform as a function of an arithmetic difference between a composite user spread-spectrum waveform and the estimated composite spread-spectrum waveform, one or more third logic elements each coupled to the second logic element, the third logic element generating a refined matched-filter detection statistic for at least a selected user as a function of
  (i) the residual composite spread-spectrum waveform and
  (ii) a characteristic of an estimate of the selected user's spread-spectrum waveform wherein the second logic element comprises summation logic which generates the residual composite spread-spectrum waveform that based on the relation $r_{res}^{(n)}[t] \equiv r[t] - \hat{r}^{(n)}[t],$ wherein $r_{res}^{(n)}[t]$ is the residual composite spread-spectrum waveform, r[t] represents the composite spread-spectrum waveform, $\hat{r}^{(n)}[t]$ represents the estimated composite spread-spectrum waveform, t is a sample time period, and n is an iteration count wherein the estimated composite spread-spectrum waveform is pulse-shaped and is based on the user spread-spectrum waveform wherein each third logic element comprises rake logic and summation logic which generates the second user matched-filter detection statistic based on the relation $y_k^{(n+1)}[m] = A_k^{(n)^2} \cdot \hat{b}_k^{(n)}[m] + y_{res,k}^{(n)}[m],$ wherein $A_k^{(n)^2}$ represents an amplitude statistic, $\hat{b}_k^{(n)}[m]$ represents a soft symbol estimate for the k$^{th}$ user for the m$^{th}$ symbol period, $y_{res,k}^{(n)}[m]$ represents the user residual matched-filter detection statistic for the m$^{th}$ symbol period, and n is an iteration count.

18. The system of claim 10, wherein the refined matched-filter detection statistic for each user is iteratively generated.

19. The system of claim 10, wherein the logic elements are implemented on any of a processors, field programmable gate arrays, array processors and co-processors, or any combination thereof.

20. A method for multiple user detection in a spread-spectrum communication system the processes long-code spread-spectrum user transmitted waveforms comprising:

generating a residual composite spread-spectrum waveform as a function of an arithmetic difference between a composite spread-spectrum waveform and an estimated composite spread-spectrum waveform, generating a refined matched-filter detection statistic that is a function of a sum of a rake-processed residual composite spread-spectrum waveform for a selected user and an amplitude statistic for that selected user, and determining one or more symbols transmitted by at least one of the users based on the refined matched-filter detection statistic, wherein the step of generating the refined matched-filter detection statistic representative of that user further comprises performing arithmetic logic based on the relation $$y_k^{(n+1)}[m] = A_k^{(n)^2} \cdot \hat{b}_k^{(n)}[m] + y_{res,k}^{(n)}[m]$$

wherein
$A_k^{(n)^2}$ represents an amplitude statistic,
$\hat{b}_k^{(n)}[m]$ represents a soft symbol estimate for the $k^{th}$ user for the $m^{th}$ symbol period,
$y_{res,k}^{(n)}[m]$ represents a residual matched-filter detection statistics, and
n is an iteration count.

21. The method of claim 20, comprising generating a refined matched-filter detection statistic that is a function of a sum of a rake-processed residual composite spread-spectrum waveform for a selected user and an amplitude statistic for that selected user multiplied by a soft symbol estimate.

22. The method of claim 20, further wherein the spread-spectrum communications system is a code division multiple access (CDMA) base station.

23. The method of claim 20, wherein the step of generating the residual composite spread-spectrum waveform further comprises performing arithmetic logic that is based on the relation $$r_{res}^{(n)}[t] \equiv r[t] - \hat{r}^{(n)}[r],$$

wherein
$r_{res}^{(n)}[t]$ is the residual composite spread-spectrum waveform,
$r[t]$ represents the composite spread-spectrum waveform,
$\hat{r}^{(n)}[t]$ represents the estimated composite spread-spectrum waveform,
t is a sample time period, and
n is an iteration count.

24. The method of claim 20, wherein the estimated composite spread-spectrum waveform is pulse-shaped and is based on a composite user re-spread waveform.

25. The method of claim 20, the further improvement wherein the refined matched-filter detection statistic is generated by a long-code receiver.

26. A method for multiple user detection in a spread-spectrum communication system that processes long-code spread-spectrum user transmitted waveforms comprising:

generating a residual composite spread-spectrum waveform as a function of an arithmetic difference between a composite spread-spectrum waveform and an estimated composite spread-spectrum waveform,
generating a refined matched-filter detection statistic that is a function of a sum of a rake-processed residual composite spread-spectrum waveform for a selected user and an amplitude statistic for that selected user, and
determining one or more symbols transmitted by at least one of the users based on the refined matched-filter detection statistic,
wherein the step of generating the residual matched-filter detection statistic for an $m^{th}$ symbol period comprises performing arithmetic logic based on the relation $$y_{res,k}^{(n)}[m] \equiv \text{Re}\left\{\sum_{p=1}^{L} \hat{a}_{kp}^{(n)H} \cdot \frac{1}{2N_k} \sum_{r=0}^{N_\lambda-1} r_{res}^{(n)}[rN_c + \hat{\tau}_{kp}^{(n)} + mT_k] \cdot c_{km}^*[r]\right\}$$

wherein
$y_{res,k}^{(n)}[m]$ represents the user residual matched-filter detection statistic for the $m^{th}$ symbol period,
L is a number of multi-path components,
$\hat{a}_{kn}^{(n)H}$ is the estimated complex channel amplitude for the $p^{th}$ multipath component for the $k^{th}$ user,
$N_k$ is the spreading factor for the $k^{th}$ user,
$r_{res}^{(n)}[t]$ is the residual composite spread-spectrum waveform,
$N_c$ is the number of samples per chip, and
$\hat{\tau}_{kp}^{(n)}$ is the time lag for the $p^{th}$ multipath component for the $k^{th}$ user,
m is a symbol period,
$T_k$ is a channel symbol duration for the $k^{th}$ user,
$c^*_{km}[r]$ represents a complex conjugate of a user code comprising at least a scrambling code, an orthogonal variable spreading factor code, and a j factor associated with even numbered dedicated physical channels,
n is an iteration count.

* * * * *